(12) United States Patent
Mizuta

(10) Patent No.: US 7,685,498 B2
(45) Date of Patent: Mar. 23, 2010

(54) DIGITAL BROADCASTING SYSTEM AND DIGITAL BROADCAST TRANSMISSION AND RECEPTION METHOD

(75) Inventor: Takashi Mizuta, Hirakata (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 10/586,438

(22) PCT Filed: May 27, 2005

(86) PCT No.: PCT/JP2005/010198

§ 371 (c)(1),
(2), (4) Date: Jul. 18, 2006

(87) PCT Pub. No.: WO2005/117444

PCT Pub. Date: Dec. 8, 2005

(65) Prior Publication Data

US 2008/0276287 A1    Nov. 6, 2008

(30) Foreign Application Priority Data

May 31, 2004  (JP)  ............................ 2004-161007

(51) Int. Cl.
*G11C 29/00* (2006.01)
(52) U.S. Cl. .................................... 714/762
(58) Field of Classification Search .............. 714/746, 714/748, 762; 375/240.01, 240.27
See application file for complete search history.

(56) References Cited

U.S. PATENT DOCUMENTS 6,366,615 B2 *  4/2002  Kato et al. ............. 375/240.14
6,907,028 B2    6/2005  Laiho et al. ................. 370/347
7,061,936 B2    6/2006  Yoshimura et al. .......... 370/389

FOREIGN PATENT DOCUMENTS

| EP | 1333668 | * | 6/2003 |
| EP | 1 337 071 | | 8/2003 |
| JP | 11-163783 | | 6/1999 |
| JP | 2001-320422 | | 11/2001 |

OTHER PUBLICATIONS

Y. Wang et al., "Error Control and Concealment for Video Communication: A review," Proceedings of the IEEE, IEEE., New York, US, vol. 86, No. 5, May 2000, pp. 974-997, XP000933873.

* cited by examiner

*Primary Examiner*—Shelly A Chase
(74) *Attorney, Agent, or Firm*—Wenderoth, Lind & Ponack, L.L.P.

(57) ABSTRACT

A digital broadcasting system transmitting and receiving a broadcast stream created from a broadcast source. The system includes a hierarchical coding unit (2) coding the broadcast source depending on a characteristic of the broadcast source and generating, from the coded broadcast source, a first layer code and a second layer code which can respectively be used for reproduction of the broadcast source and includes a synthesis unit (5) generating data bursts, each including the generated first and second layer code. The system also includes a multiplexing unit (7) creating the broadcast stream by multiplexing the generated data bursts, a transmission unit (9) transmitting the created broadcast stream to the network, a tuning/demodulation unit (301) receiving the transmitted broadcast stream, a synchronization unit (302) extracting, from the received broadcast stream, at least one of the first layer code and the second layer codes and a TS decoder (303) reproducing the broadcast source using the extracted code.

11 Claims, 19 Drawing Sheets

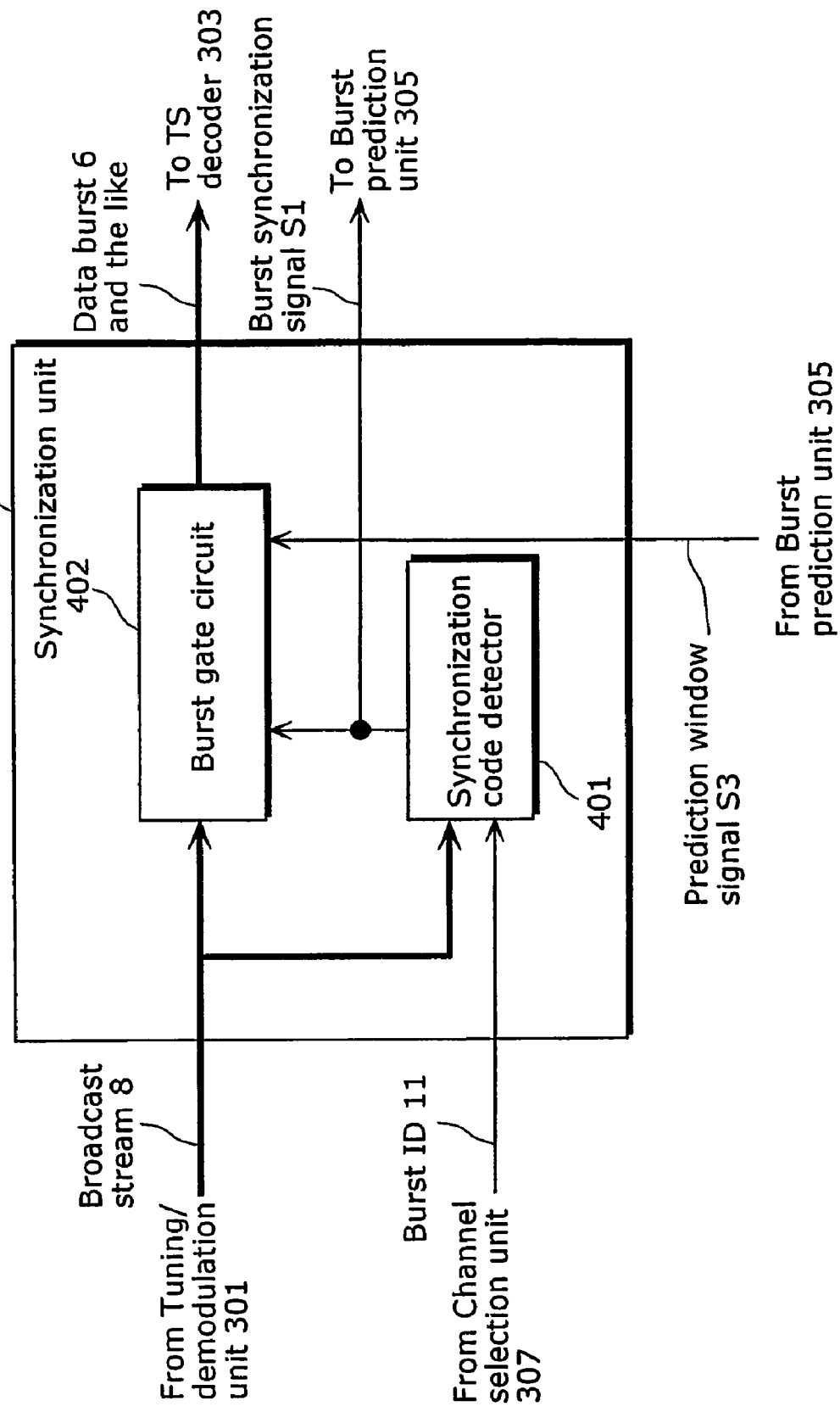

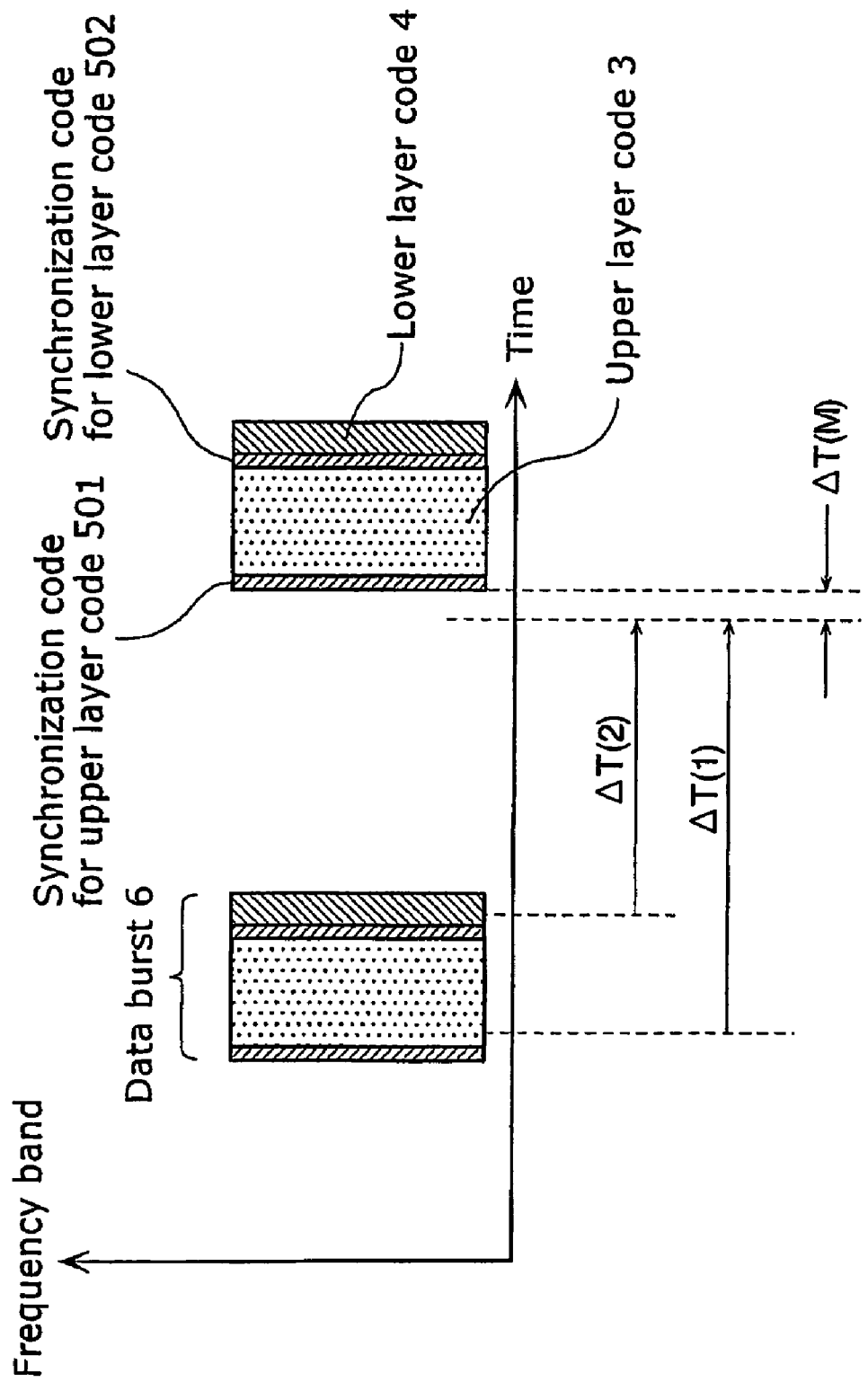

DIGITAL BROADCASTING SYSTEM AND DIGITAL BROADCAST TRANSMISSION AND RECEPTION METHOD

BACKGROUND OF THE INVENTION

1. Field of Invention

The present invention relates to a digital broadcasting system, and particularly to a method of transmitting and receiving digital broadcasts and digital data broadcasts suitable for mobile terminals driven by batteries and a transmission apparatus and a reception apparatus in the digital broadcasting system.

2. Description of the Related Art

In Europe, digital terrestrial broadcasts are transmitted to stationary receiving terminals according to the standard (DVB-T EN 300 477) developed by the European Technical Standards Institute (ETSI). In order to receive a digital terrestrial broadcast at a mobile terminal, a broadcast wave is divided into frequency segments in advance and then transmitted, as defined in a Japanese domestic standard (ARIB STD-B31). In this case, a popular television receiver receives all the segments to reproduce them on a large-sized screen, while a mobile terminal receives only one or a few segments to reproduce them on a small-sized screen.

Unlike the Japanese standard, the European standard does not define this partial reception of the frequency segments, so it is necessary to receive all the frequency bands of the broadcast wave in series in order to receive the broadcast service at the mobile terminal, which results in the consumption of much power particularly in the high frequency front end module. Therefore, in a mobile terminal driven by a battery, the battery is drained so quickly that it becomes difficult for the terminal to receive a long-time broadcast service continuously. This is a practical problem.

Against this backdrop, a scheme has been suggested, in which as shown in FIG. 1, a digital broadcast stream including services A to D as data bursts is transmitted in a short time by performing time-division multiplexing of these service data exclusively on each service, and the power is supplied to the high frequency front end module of the receiver only during the periods of arrival of the data bursts of the target service (namely, the high frequency front end module is powered off during the periods of arrival of the data bursts of the other services) (See European Laid-open Patent Application No. 1337071). This scheme enables reduction of average power consumption employing the characteristic that the duration of the arrival of the data bursts of the target service selected by the user is sufficiently shorter than the duration of the arrival of the data bursts of the other services. This scheme is referred to as "time-slicing".

However, the above time-slicing scheme has the following problems. Once the receiver misses a data burst in the condition of a low carrier/noise ratio (hereinafter referred to as "C/N") due to a bad radio wave reception, it cannot obtain the data burst normally until the recovery of synchronization, and therefore the reproduction of the service is interrupted. In addition, since the tuning/demodulation unit needs to be powered on continuously for the recovery of synchronization, much power is consumed.

BRIEF SUMMARY OF THE INVENTION

The present invention has been conceived in order to solve the above conventional problems, and an object thereof is to provide a digital broadcasting system or the like which prevents reproduction of a service from being discontinued even in the low C/N condition or the like.

In order to solve the above conventional problems, the present invention is a digital broadcasting system for transmitting and receiving, via a network, a broadcast stream created from a broadcast source that includes image and audio data and is used for broadcasting, the digital broadcasting system including: a coding unit operable to code a broadcast source depending on a characteristic of the broadcast source and to generate a first layer code and a second layer code from the coded broadcast source, the first layer code and the second layer code, respectively, being able to be used for reproduction of the broadcast source; a synthesizing unit operable to generate data bursts, each of which includes the generated first layer code and second layer code; a multiplexing unit operable to create a broadcast stream by multiplexing the generated data bursts; a transmitting unit operable to transmit the created broadcast stream to the network; a receiving unit operable to receive the transmitted broadcast stream; a decoding unit operable to extract, from the received broadcast stream, at least one of the first layer code and the second layer code; and a reproducing unit operable to reproduce the broadcast source using the extracted code.

According to the above structure, the probability that the lower layer code (second layer code) of smaller code size can be obtained is high even if the synchronization of the data burst is lost in the low C/N or the like. Therefore, it becomes possible to decode the lower layer so as to continue the reproduction of the service without being interrupted.

In the above-mentioned digital broadcasting system, the broadcast source includes content data for each of services, the digital broadcasting system further includes: a clocking unit operable to keep time; and a prediction window generating unit operable to generate a prediction window signal that indicates a time at which a target data burst to be received appears in the broadcast stream, the time being specified by the clocking unit, and the receiving unit is operable to receive only a data burst that corresponds to content data of one of the services, in the broadcast stream, only while the prediction window signal is in an active state.

According to the above structure, even if the synchronization of the data burst is lost in the lower C/N, the clocking unit and the prediction window generating unit open the prediction window at the time when the data burst appears in the broadcast stream, so that the stream can be obtained only while the prediction window opens. Therefore, it becomes possible to prevent the reproduction of the service from being discontinued by the loss of synchronization.

In the above-mentioned digital broadcasting system, the receiving unit is further operable to control power supply for the reception of the data burst so that the power supply increases only while the prediction window signal is in the active state.

According to the above structure, even if the synchronization of the data burst is lost in the lower C/N, the power supply is controlled so that the data burst is received only while the prediction window opens. Therefore, it becomes possible to reduce the power consumption even during the recovery of synchronization, and to reduce the drain of the battery that is the power source.

In the above-mentioned digital broadcasting system, the synthesizing unit is further operable to add burst time information into each data burst, the burst time information indicating a time at which a next data burst to be received appears in the broadcast stream, and the prediction window generating unit is operable to determine a timing at which the prediction window signal turns into the active state and a window width of the prediction window signal, according to the burst time information added into the data burst.

In the above-mentioned digital broadcasting system, the receiving unit includes a time-keeping unit operable to keep a reference time of the digital broadcast system, and the time-keeping unit is operable to correct the reference time according to the burst time information.

In the above-mentioned digital broadcast system, the prediction window generating unit is further operable to expand a window width of the prediction window signal by a predetermined length of time in the case where the receiving unit cannot receive a whole signal of the target data burst.

In the above-mentioned digital broadcast system, the synthesizing unit is further operable to add, to each data burst, at least one error correction code for correcting a code error which occurs when the broadcast stream is transmitted.

In the above-mentioned digital broadcast system, the error correction codes are added to the first layer code and the second layer code individually, and a correction capability of the error correction code added to the second layer code is higher than a correction capability of the error correction code added to the first layer code.

Another aspect of the present invention is a transmission apparatus for use in a digital broadcasting system for transmitting and receiving, via a network, a broadcast stream created from a broadcast source that includes image and audio data and is used for broadcasting, the transmission apparatus including: a coding unit operable to code a broadcast source depending on a characteristic of the broadcast source and to generate a first layer code and a second layer code from the coded broadcast source, the first layer code and the second layer code, respectively, being able to be used for reproduction of the broadcast source; a synthesizing unit operable to generate data bursts, each of which includes the generated first layer code and second layer code; a multiplexing unit operable to create a broadcast stream by multiplexing the generated data bursts; and a transmitting unit operable to transmit the formed broadcast stream to the network.

Still another aspect of the present invention is a reception apparatus for use in a digital broadcasting system for transmitting and receiving, via a network, a broadcast stream created from a broadcast source that includes image and audio data and is used for broadcasting, the reception apparatus including: a receiving unit operable to receive a broadcast stream via the network; a decoding unit operable to extract, from the received broadcast stream, at least one of a first layer code and a second layer code which are generated from the broadcast source that has been coded depending on a characteristic of the broadcast source, and which can respectively be used for reproduction of the broadcast source; and a reproducing unit operable to reproduce the broadcast source using the extracted code.

Note that the present invention can be embodied not only as a digital broadcast transmission and reception method including the characteristic units included in the above digital broadcasting system, as steps, but also as a program for causing a personal computer to execute these steps. It is needless to say that the program can be distributed via a storage medium such as a DVD™ or a transmission medium such as the Internet.

According to the present invention, in the case where the synchronization of the data burst is lost in the low C/N or the like, the clocking unit predicts the time at which the data burst appears in the stream and opens the prediction window. Therefore, it becomes possible to obtain the stream only while the prediction window opens. In addition, even in the case where the position of the prediction window deviates from the actual position of the data burst, it becomes possible to decode the lower layer code (second layer code) of small code size so as to prevent the reproduction of the service from being discontinued.

As further information about technical background to this application, the disclosure of Japanese Patent Application No. 2004-161007 filed on May 31, 2004 including specification, drawings and claims is incorporated herein by reference in its entirety.

BRIEF DESCRIPTION OF DRAWINGS

These and other objects, advantages and features of the invention will become apparent from the following description 6 thereof taken in conjunction with the accompanying drawings that illustrate a specific embodiment of the invention. In the Drawings:

FIG. 6 is a block diagram showing a functional structure of a synchronization unit according to the first embodiment of the present invention;

FIG. 7 is a diagram for illustrating a structure of a data burst and ΔT information according to the first embodiment of the present invention;

DETAILED DESCRIPTION OF THE INVENTION

The embodiments of the present invention are described below with reference to the diagrams. Note that although only some exemplary embodiments of the present invention are described below with reference to the attached diagrams, the present invention is not limited to these embodiments.

The following processing performed according to the present invention can be embodied as software, and the program for the software can be stored in a storage medium.

First Embodiment

Figure 1:
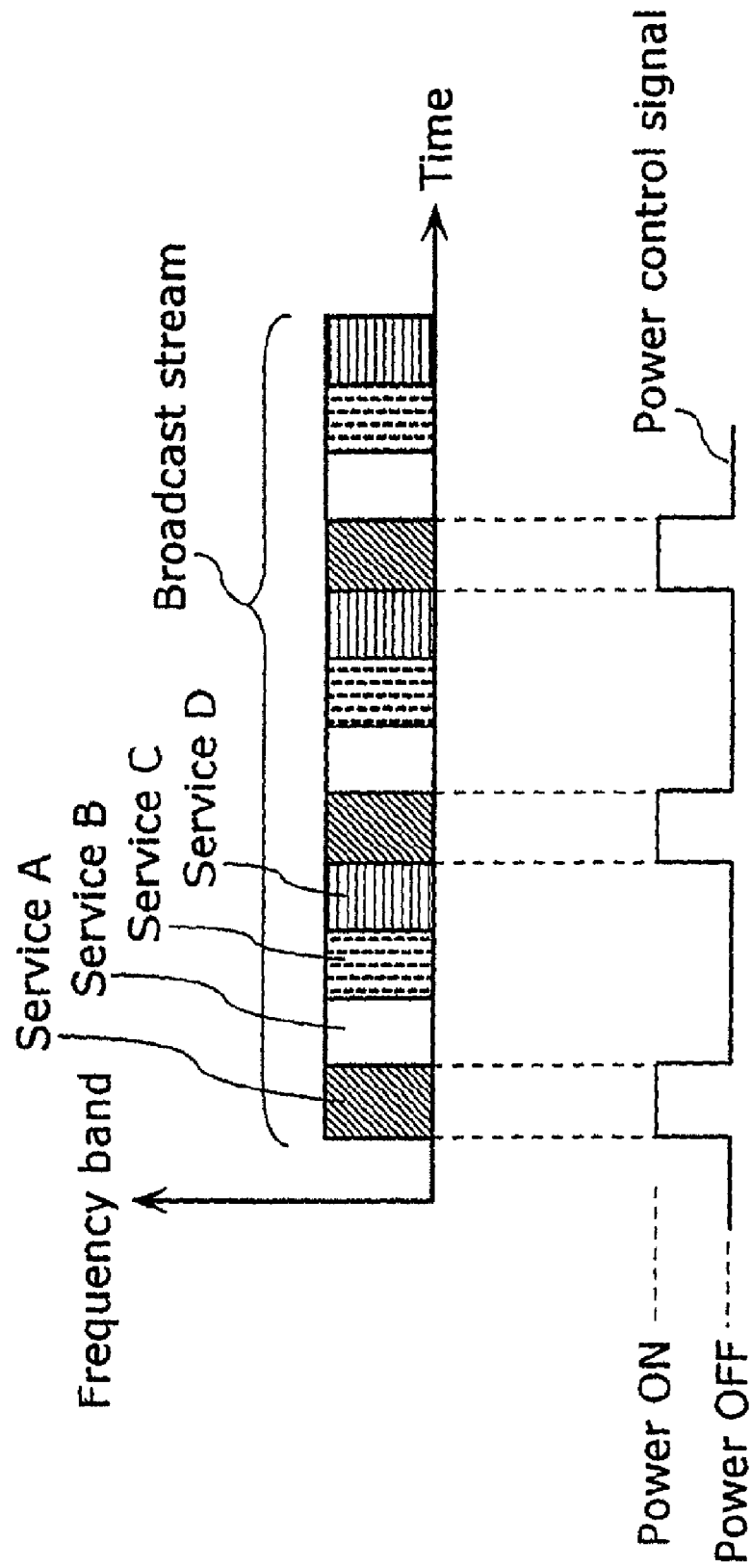
FIG. 1 is a schematic diagram of a transmission scheme in a conventional digital broadcasting system.
Figure 2:
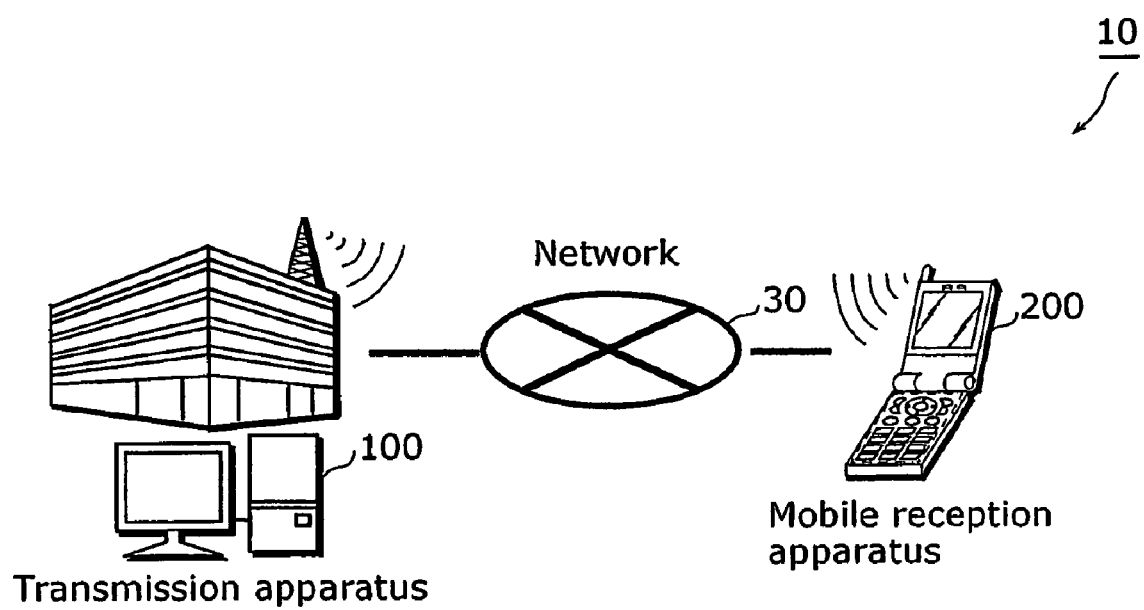
FIG. 2 is a schematic diagram of a digital broadcasting system according to a first embodiment of the present invention.

FIG. 2 is a schematic diagram of a digital broadcasting system 10 according to the present embodiment. As shown in FIG. 2, the digital broadcasting system 10 includes a transmission apparatus 100 and at least one mobile reception apparatus 200, and these apparatuses are connected with each other via a network 30.

The transmission apparatus 100 generates a broadcast stream by multiplexing sources (which are also referred to as contents) for supplying various services to a user (which is also referred to as a viewer), and transmits the broadcast stream to the network 30.

The mobile reception apparatus 200 is a mobile phone including, for example, a digital broadcast tuner, a liquid crystal panel and a speaker. This mobile reception apparatus 200 receives a broadcast stream via the network 30, decodes it, and displays the contents of the service selected by the user on the liquid crystal panel or the like.

Figure 3:
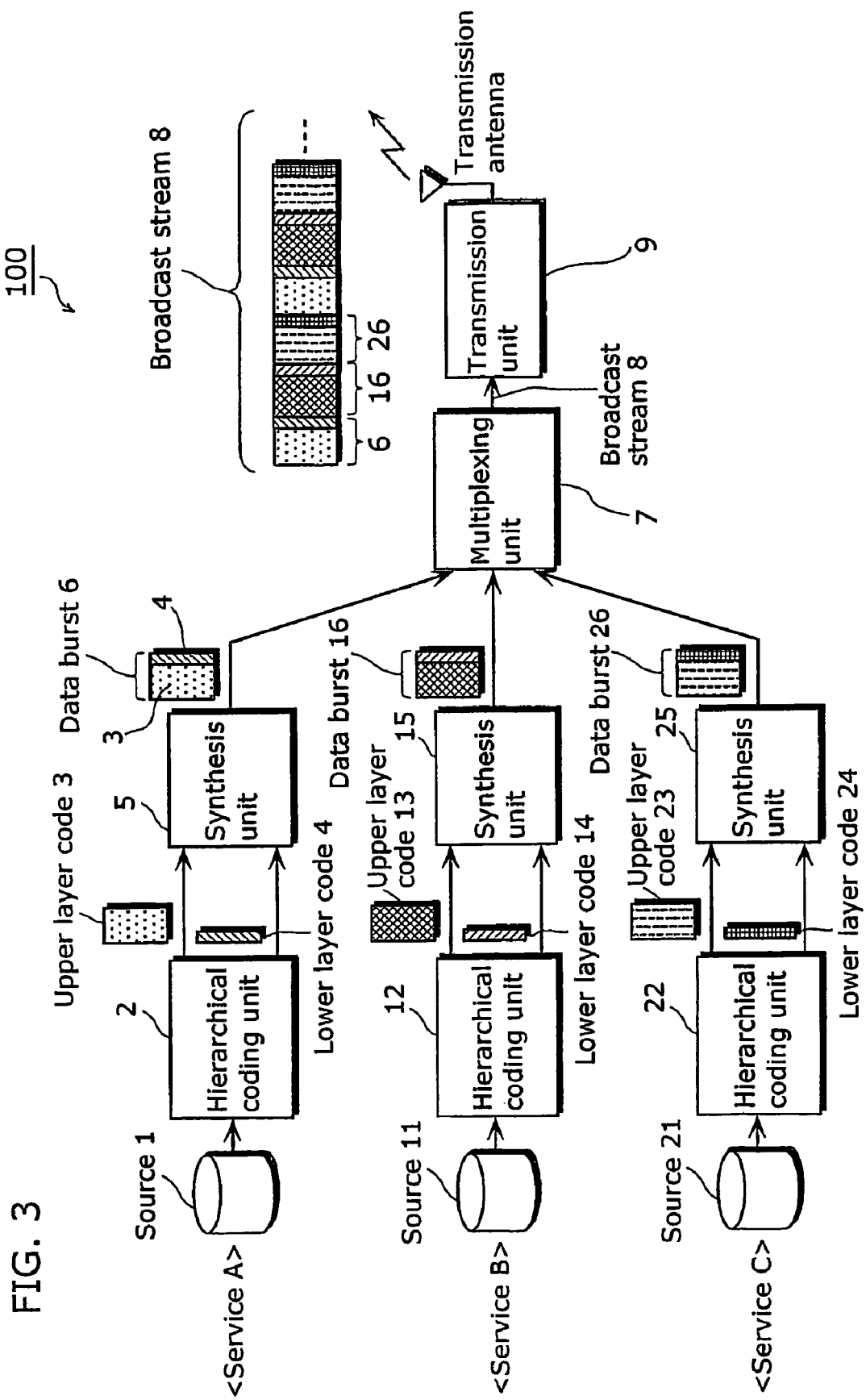
FIG. 3 is a block diagram showing schematically functions of a transmission apparatus according to the first embodiment of the present invention.

FIG. 3 is a block diagram showing schematically the functions of the transmission apparatus 100 according to the present embodiment.

As shown in FIG. 3, the transmission apparatus 100 is an apparatus for transmitting a broadcast stream 8 to the network 30 via a transmission antenna. This broadcast stream 8 is generated by coding and multiplexing sources 1, 11 and 21 of three types of services A, B and C. The transmission apparatus 100 includes hierarchical coding units 2, 12 and 22 and synthesis units 5, 15 and 25 for respective services, as well as a multiplexing unit 7 and a transmission unit 9 in common.

The source 1 of the service A is content including image and audio data (for example, a movie or music live content data). Note that the source 11 of the service B and the source 21 of the service C are also the contents similar to the content of the source 1 of the service A.

The hierarchical coding unit 2 separates the inputted source 1 into high frequency component data and low frequency component data according to the frequencies (such as spatial frequencies and audio frequencies) of image and audio data included in the source 1, and performs highly efficient coding (for example, coding according to MPEG-4) on respective data. More specifically, the hierarchical coding unit 2 outputs, separately, an upper layer code 3 (first layer code) obtained by performing highly efficient coding on the high frequency components and a lower layer code 4 (second layer code) obtained by performing highly efficient coding on the lower frequency components. Note that the hierarchical coding unit 12 and the hierarchical coding unit 22 also have the same function as the above hierarchical coding unit 2.

The synthesis unit 5 synthesizes the upper layer code 3 and the lower layer code 4 outputted from the hierarchical coding unit 2 and outputs the data burst 6 for the source 1 of the service A. When outputting the data burst 6, the synthesis unit 5 calculates an error-correction code, if necessary, after interleaving the synthesized code, and adds it into the data burst 6. In other words, the synthesis unit 5 also functions as an error correction code generator. The codes are concatenated in the data burst 6 so that the lower layer code 4 follow the upper layer code 3.

Similarly, the synthesis unit 15 synthesizes the upper and lower layer codes of the source 11 of the service B so as to output the data burst 16, while the synthesis unit 25 synthesizes the upper and lower layer codes of the source 21 of the service C so as to output the data burst 26.

The multiplexing unit 7 performs time-division multiplexing on the data bursts 6, 16 and 26 of respective sources so as to generate a broadcast stream 8. More specifically, the multiplexing unit 7 generates a single broadcast stream 8 that is a series of data bursts of respective sources arranged in such a manner as data bursts 6, 16, 26, 6, 16, 26 . . . (See FIG. 3).

The transmission unit 9 transmits the broadcast stream 8 generated by the multiplexing unit 7 to the network 30.

Therefore, the broadcast stream 8 is a series of multiplexed data bursts, each of which consists of upper and lower layer hierarchical codes for each service, namely, a repetition of a series of data for supplying various services.

Note that the above-mentioned highly efficient coding scheme is not limited to MPEG-4, and it may be another coding scheme which enables hierarchical coding, such as MPEG-2 and H.264/AVC.

In the case where a source is video (moving image) with audio data, it is also possible to perform hierarchical coding on the audio data to generate the upper and lower layer codes and to concatenate or multiplex them with the upper and lower layer codes of the video data respectively, or to concatenate or multiplex the audio data, without being separated into layers, with the lower layer code of the video data.

Here, it is assumed, for example, that the upper layer code is the code obtained by compressing the audio and video data at the rate of 350 kbps according to MPEG-4, while the lower layer code is the code obtained by compressing the audio and video data at the rate of 64 kbps according to MPEG-4. It is further assumed that these codes are converted into packets according to Internet Protocol (IP) and then multiplexed into a single transport stream (TS) defined in MPEG-2. Since the transmission rates are 15 Mbps or so in the actual broadcasting systems, 36 types of services can be transmitted in the present system configured as mentioned above.

Note that above numerical values are just examples for easy understanding, and the present invention is not limited to these values. In addition, the present invention may be applied to still image data, graphics data, text data or a combination of these data, instead of video data. Furthermore, as for audio data, the present invention may be applied to music scale data compliant with the MIDI standard or the like. Or, it may be applied to a service consisting of image data only or audio data only.

Figure 4:
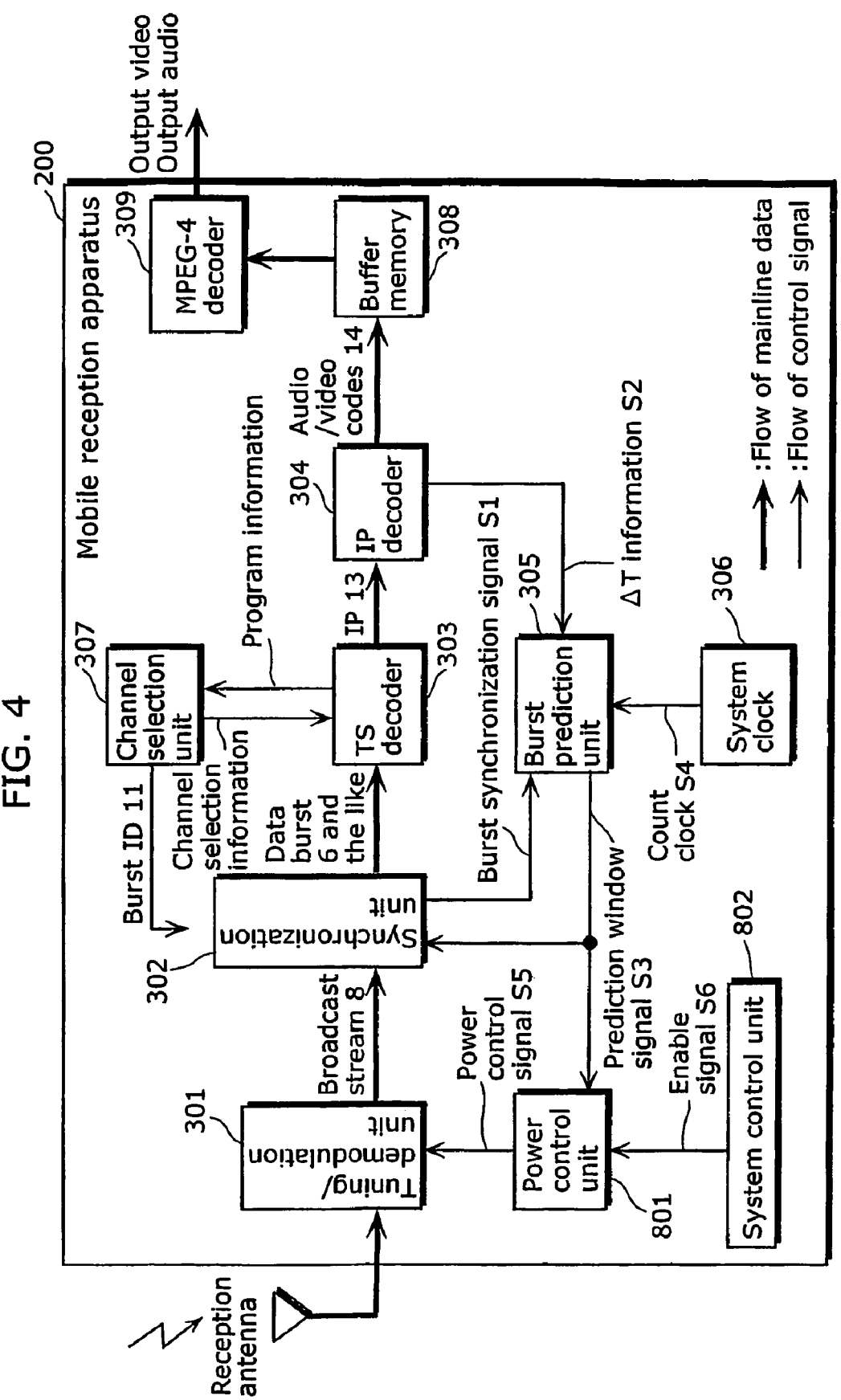
FIG. 4 is a block diagram showing a functional structure of a mobile reception apparatus according to the first embodiment of the present invention.

FIG. 4 is a block diagram showing the functional structure of the mobile reception apparatus 200 according to the present embodiment.

As shown in FIG. 4, the mobile reception apparatus 200 includes a tuning/demodulation unit 301, a synchronization unit 302, a TS decoder 303, an IP decoder 304, a bust prediction unit 305, a system clock 306, a channel selection unit 307, a buffer memory 308, an MPEG-4 decoder 309, a power control unit 801 and a system control unit 802.

The tuning/demodulation unit 301 performs frequency tuning and demodulation on broadcast waves received via a reception antenna so as to obtain the broadcast stream 8, and outputs it to the synchronization unit 302 in the next stage.

In the case where the C/N is high and the error rate of the transmission line is low, the synchronization unit 302 extracts, from the broadcast stream 8, the data burst of the service specified by the user via the channel selection unit 307, and outputs it to the TS decoder 303. At the same time, the synchronization unit 302 detects the synchronization code attached to the beginning of the data burst, and obtains the temporal position of the data burst with this synchronization code as a clue. The synchronization unit 302 further outputs, to the burst prediction unit 305, a burst synchronization signal S1 indicating the temporal position of this data burst. This extracted data burst is a packet in TS format defined by MPEG-2, in which audio data, video data, control data and the like that constitute the service are multiplexed. In addition, the data burst is made up of the upper layer code and the lower layer code obtained by hierarchical coding, as shown in FIG. 3.

The TS decoder 303 performs code error correction of the data burst received from the synchronization unit 302, extracts the payload data that is the data body by decoding the TS packet, and outputs it to the IP decoder 304. Namely, the TS decoder 303 also functions as an error correction unit. Decoding is performed on both the TS packet including the upper layer code and the TS packet including the lower layer code, so that coded data of these TS packets are extracted respectively.

At the same time, the TS decoder 303 extracts program information such as the frequency information of a service program, program number and packet ID number, from the program specific information (PSI) that is the control data which is multiplexed on the TS.

The channel selection unit 307 outputs, based on the program information, channel selection information corresponding to the service (program) selected by the user.

The TS decoder 303 selectively extracts the TS packet assigned the target packet ID number, according to the channel selection information. The extracted TS packet contains an IP packet (or IP packets) that includes, as payload, coded audio and video data of the service program, and this IP packet is encapsulated into the TS packet and transmitted. Furthermore, the information (hereinafter referred to "ΔT information") indicating the relative time duration until the appearance of the next data burst of the same service is embedded in the MAC address field of the IP packet.

The IP decoder 304 decodes the IP packet extracted by the TS decoder 303, and extracts the coded data of both the upper layer code and lower layer code of the audio and video data transmitted as the payload of the IP packet, as well as the ΔT information. Since the coded audio and video data is in burst form, the rate thereof is converted by being read out at a fixed rate after stored in the buffer memory 308 once. After that, both the coded data of the upper layer code and lower layer code are decoded by the MPEG-4 decoder in the next stage, and outputted as audio and video corresponding to the service. Since the hierarchical upper and lower layer codes are both decoded in this case, it becomes possible to obtain a reproduction signal with high quality which covers the whole bands of frequencies from the lower through the higher frequencies.

Figure 5A:
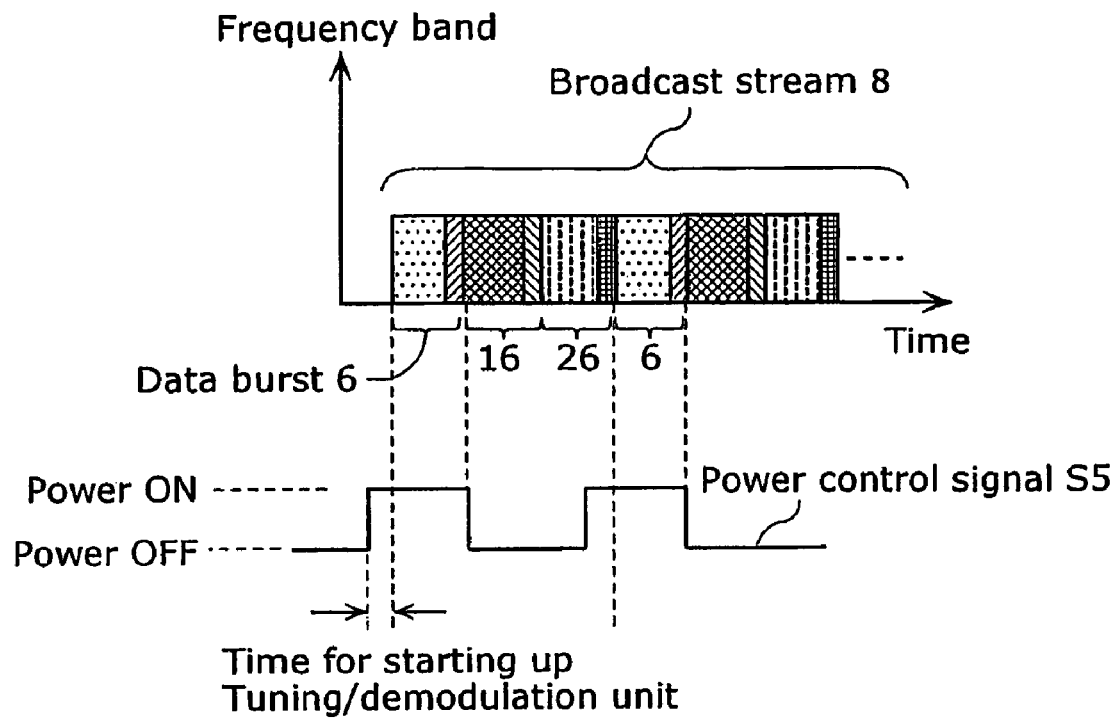
FIG. 5A is a diagram showing timing between data bursts and a power control signal in the first embodiment of the present invention.

The power control unit 801 generates a power control signal S5 based on the timing of the prediction window signal S3 generated by the burst prediction unit 305, and turns ON/OFF the power of the tuning/demodulation unit 301. Since the power control signal S5 needs to be outputted earlier than the appearance of the data burst in consideration of the time required for starting up the tuning/demodulation unit 301 as shown in FIG. 5A to be described later, the time duration up to the "ON" timing includes the starting-up time thereof.

Here, a "prediction window (or a prediction window signal)" denotes a timing signal used for extracting the data burst of a target service from a data stream in which the data bursts of various services are multiplexed by time-division. More specifically, a prediction window signal is a gate signal that the receiver itself opens. The receiver predicts the temporal position (timing) at which a data burst of a target service included in a data stream appears, and based on the prediction result, it opens the gate signal slightly before the predicted timing. In other words, if a received data stream is gated by a prediction window signal, it becomes possible to search out a preamble of a target data burst in a data stream slightly before the appearance of that data burst, and detect and capture the synchronization code following the preamble of the data burst, and therefore, it is possible to reduce the time duration in which the synchronization code detection unit is vulnerable to data error. As a result, it becomes possible to reduce the occurrence probability of synchronization code detection error and improve the detection accuracy. Particularly in the case where a data stream includes a lot of errors due to a very bad C/N of a transmission line, a prediction window improve the synchronization detection accuracy significantly. Note that the prediction unit for generating a prediction window stores synchronization interval information obtained when synchronization is normally detected because C/N of a transmission line is good, and generates the prediction window using the stored synchronization interval information when it predicts the timing.

According to the above structure, a data burst can be captured only if the power is supplied to the tuning/demodulation unit 301 when necessary. Therefore, it becomes possible to receive the service program both in the high C/N and the low C/N, while reducing the power consumption.

Upon receiving an enable signal S6 from the system control unit 802, the power control unit 801 generates the power control signal S5 for repeating ON or OFF according to the prediction window signal S3 when the enable signal S6 is ON, while it maintains the ON state of the power control signal S5 when the enable signal S6 is OFF.

Note that the tuning/demodulation unit performs the function of turning the power ON/OFF, but the present invention does not limit such a function block to the tuning/demodulation unit. Any other function block may perform the function of turning the power ON/OFF if it can be performed timing control of its power line.

The system control unit 802 is, for example, a microcomputer including ROM, RAM or the like, and controls all over the operations of the mobile reception apparatus 200.

The mobile reception apparatus 200 structured as mentioned above enables the system control unit to control the power ON/OFF of the tuning/demodulation unit 301 at any time. Therefore, it serves the purpose of supporting the case where the tuning/demodulation unit 301 needs to be continuously energized for establishing initial synchronization of bursts, for example, immediately after the power of the receiver is turned ON, and immediately after the channel of broadcast frequency is changed.

FIG. 5A is a diagram showing the timing between respective data bursts and the power control signal S5 during the reception of the broadcast stream 8 in the present embodiment. FIG. 5A shows how a data burst 6 is captured using the power control signal S5 in the case where a user selects a service A.

As shown in FIG. 5A, the power supply to the tuning/demodulation unit 301 of the mobile reception apparatus 200 starts about 250 msec before starting the reception of the data burst 6 because it takes about 250 msec to start up the tuning/demodulation unit 301 so that it can start receiving the data burst 6 and capture it normally.

Figure 5B:
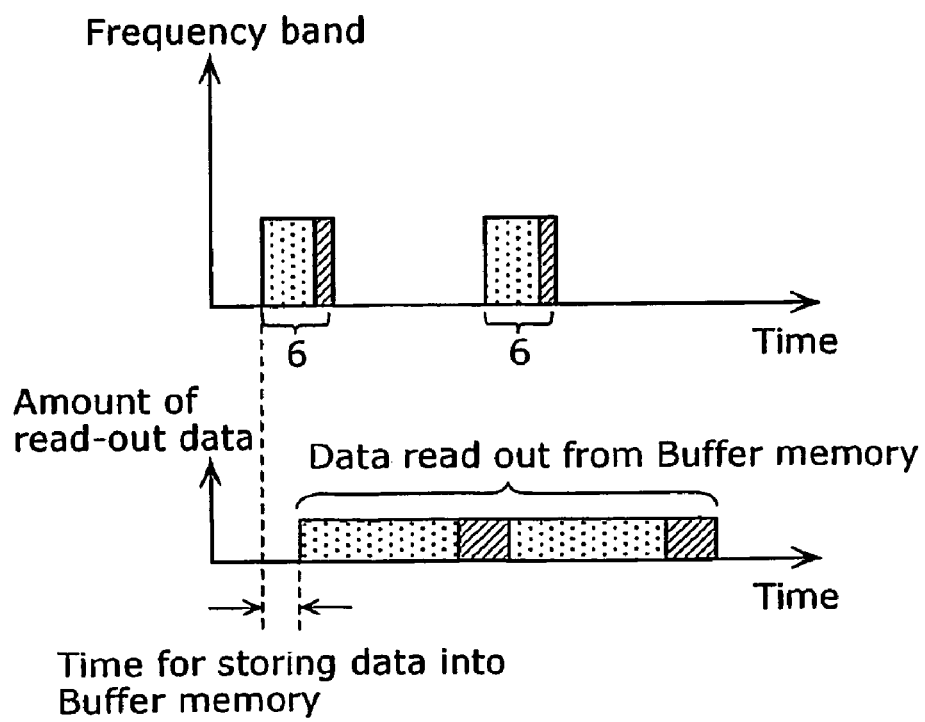
FIG. 5B is a diagram showing timing between a data burst and a storage time of the data burst into a buffer memory in the first embodiment of the present invention.

FIG. 5B is a diagram showing the rate conversion of the data burst in the present embodiment.

As shown in FIG. 5B, once the data burst 6 is captured, the received data of the service A which has been transmitted in burst form is stored into the buffer memory 308, and read out from the buffer memory 308 after a predetermined storage time. Although the power supply to the tuning/demodulation unit 301 stops after the bust transmission is completed, the power is continuously supplied to the MPEG-4 decoder 309 so that it can reproduce the content while reading out the data from the buffer memory 308 at the rate required for the reproduction.

As described above, since the power is supplied to the tuning/demodulation unit 301 only during the required time period, power consumption can be reduced.

Next, a description is given below, with reference to FIG. 4 and FIG. 6 to FIG. 9, of the reception operation of the mobile reception apparatus 200 in a bad error ratio of a transmission line due to a low C/N or the like.

FIG. 6 is a block diagram showing the functional structure of the synchronization unit 302 of the mobile reception apparatus 200 according to the present embodiment. As shown in FIG. 6, the synchronization unit 302 includes a burst gate circuit 402 and a synchronization code detector 401.

The low C/N increases the probability that the synchronization code assigned to the beginning of a data burst is missed and cannot be detected, and thus the burst synchronization signal S1 is interrupted. The burst prediction unit 305 monitors the burst synchronization signal S1 all the time. The IP decoder 304 obtains all the time the $\Delta T$ information S2 that is the extracted burst time-keeping means.

In the good reception condition such as a high C/N, the next burst position (timing) is predicted based on the immediately previous $\Delta T$ information S2, however while the burst synchronization signal S1 is applied preferentially if it is inputted from the synchronization unit 302, and the prediction window signal S3 just outputs a timing signal governed by the burst synchronization signal S1, regardless of the value predicted based on the $\Delta T$ information S2.

On the other hand, in the bad reception condition such as a low C/N, the burst synchronization signal S1 is interrupted, and therefore the burst synchronization signal S1 cannot be detected around the time predicted based on the $\Delta T$ information S2 which has been obtained just previously. Therefore, if the burst synchronization signal S1 cannot be detected around the predicted time, the burst prediction unit 305 predicts the position of the data burst using the just previously obtained $\Delta T$ information S2, and outputs the prediction window signal S3 so that it coincides with the predicted timing. For that purpose, the burst prediction unit 305 adds up the count clocks S4 outputted from the system clock 306, obtains the counter value that corresponds to the time indicated by the $\Delta T$ information S2, and then determines the time in which the prediction window signal is in the ON state.

The synchronization unit 302 tries to capture the target data burst from the broadcast stream using the prediction window signal S3 generated by the burst prediction unit 305 in order to capture the data burst even in the condition in which it cannot generate the burst synchronization signal S1. However, since the burst prediction unit 305 generates the prediction window signal S3 after detecting the stop of the burst synchronization signal S1, there is a possibility that the timing of starting capturing the data burst based on the timing of the prediction window signal S3 may be shifted later than the actual data burst timing. In such a case, although the upper layer code which is placed earlier in the data burst may not be captured, the lower layer code which is placed later in the data burst is probably captured. Therefore, it is possible for the MPEG-4 decoder 309 in the subsequent stage to continue the reproduction of the service program using at least the lower layer code.

Note that the $\Delta T$ information is embedded into the data burst as shown in FIG. 7 ($\Delta T(1)$ and $\Delta T(2)$ are the $\Delta T$ information which are actually embedded into the data burst 6 in FIG. 7), and indicates the relative time period from the position (time) at which it is embedded up to the position (time) at which next data burst appears. Therefore, strictly speaking, the indicated relative time is not the value which represents the interval itself between the data bursts of the same service. However, in the actual implementation, the time difference between the beginning of the data burst and the position at which the $\Delta T$ information is embedded can be ignored because the width of each data burst is smaller enough than the interval between the data bursts of the same service. This difference is insignificant because it can be absorbed into the prediction window margin $\Delta T(M)$.

As shown in FIG. 6, the synchronization unit 302 includes a synchronization code detector 401 and a burst gate circuit 402. The synchronization code detector 401 outputs the burst synchronization signal S1 for detecting the position of the data burst to be received using, as a clue, the synchronization code which is assigned to the beginning of the data burst, in order to select the data burst with the burst ID corresponding to the service selected by the user and outputted from the channel selection unit 307. The burst gate circuit 402 is a gate circuit for extracting a data burst from a TS which is inputted based on the burst synchronization signal S1 or the prediction window signal S3. Even if the prediction signal S3 is asserted while the burst synchronization signal S1 is asserted and the gate is open, the prediction signal S3 is ignored, and vice versa. That is, even if the burst synchronization signal S1 is asserted while the prediction window signal S3 is asserted and the gate is open, the burst synchronization signal S1 is ignored.

As described above, the burst synchronization signal S1 and the prediction window signal S3 perform the input processing exclusively on each other so as to maintain continuous synchronization.

FIG. 7 is a diagram for illustrating the structure of the data burst 6 and the $\Delta T$ information in the present embodiment. (Note that the following description is also applied to the data burst 16 and the data burst 26.)

The data burst 6 is made up of a synchronization code for upper layer code 501, an upper layer code 3, a synchronization code for lower layer code 502 and a lower layer code 4. Therefore, the synchronization code detector 401 captures the synchronization code for upper layer code 501 so as to obtain the $\Delta T$ information ($\Delta T(1)$, to be more specific) which is included in the upper layer code 3 and represents the synchronization of the data burst 6. The synchronization code detector 401 further captures the synchronization code for lower layer code 502 which is placed later in the data burst 6 so as to detect another ΔT information (ΔT(2), to be more specific) which is included in the lower layer code 4 and represents the synchronization of the data burst 6.

Note that the ΔT information is embedded in the MAC address field in the IP packet and indicates the relative time period from the temporal position at which the ΔT information is inserted up to the appearance of the next data burst. As this ΔT information, one or more ΔT(1) are included in the upper layer code 3, and one or more ΔT(2) are included in the lower layer code 4. This structure allows obtainment of the ΔT information even if either the upper layer code 3 or the lower layer code 4 is decoded.

Furthermore, both ΔT(1) and ΔT(2) have a temporal margin, which indicates the time earlier by ΔT(M) than the time at which the beginning of the next data burst appears. This structure produces a margin in a system for capturing synchronization, and thus allows secure capture of the synchronization code for upper layer code 501 and the synchronization code for lower layer code 502.

Figure 8:
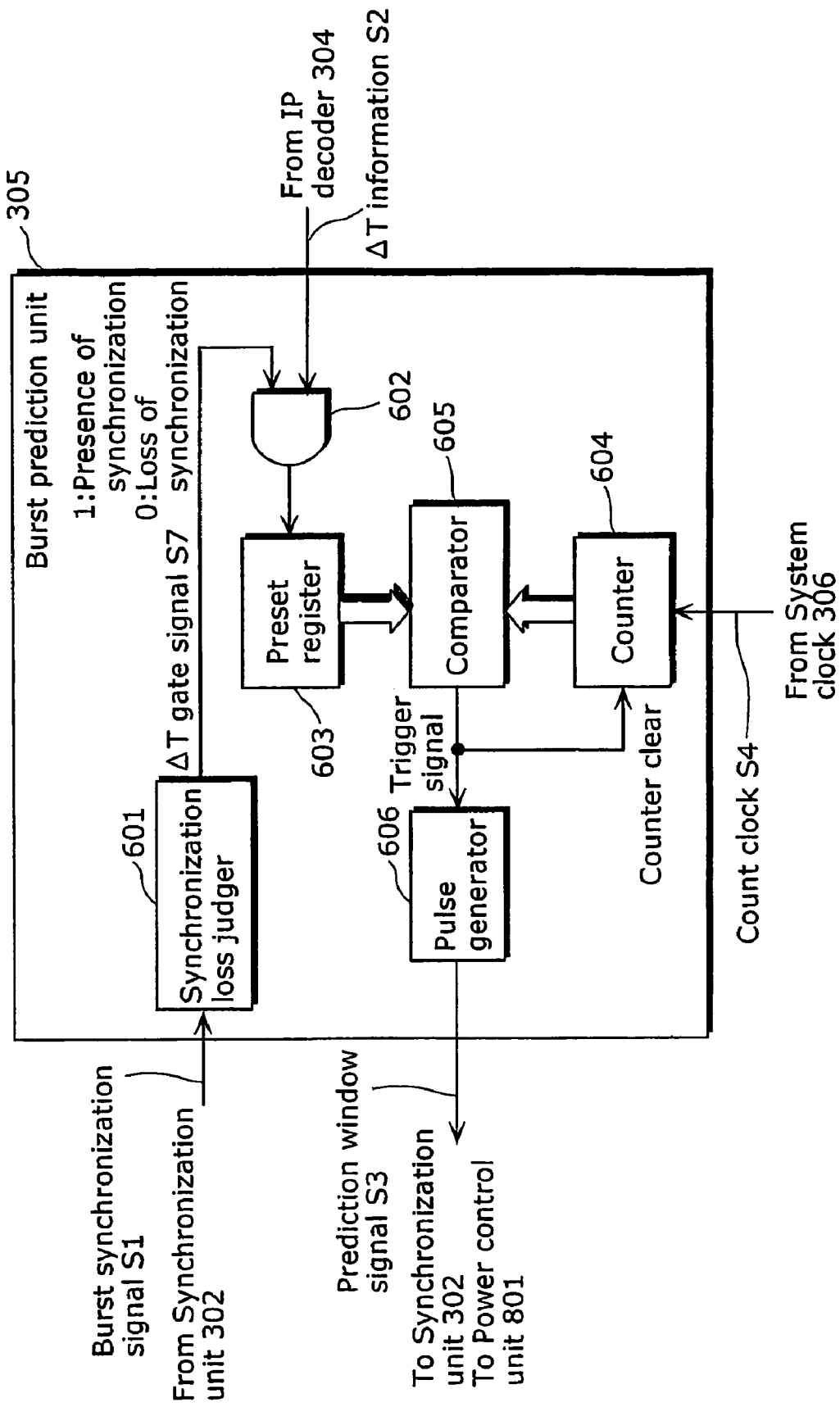
FIG. 8 is a block diagram showing a functional structure of a burst prediction unit according to the first embodiment of the present invention.

FIG. 8 is a block diagram showing the functional structure of the burst prediction unit 305 in the present embodiment.

As shown in FIG. 8, the burst prediction unit 305 includes a synchronization loss judger 601, an AND circuit 602, a preset register 603, a counter 604, a comparator 605 and a pulse generator 606.

The synchronization loss judger 601 monitors the pulse condition of the burst synchronization signal S1, and outputs a ΔT gate signal S7 depending on the pulse condition of the burst synchronization signal S1. More specifically, the synchronization loss judger 601 judges "presence of synchronization" when the pulse signal of the burst synchronization signal S1 is generated in a predetermined time period and outputs "1" as the ΔT gate signal S7, while it judges "loss of synchronization" when the pulse signal is not generated in the predetermined time period and outputs "0" as the ΔT gate signal S7.

The preset register 603 loads the ΔT information S2 and outputs it while holding the loading value. When the burst synchronization signal S1 is valid and the ΔT gate signal S7 is "1", the preset register 603 loads the ΔT information S2, while when the burst synchronization signal S1 is invalid and the ΔT gate signal S7 is "0", the ΔT information S2 is interrupted in the AND circuit 602, so the preset register 603 holds the value of the latest ΔT information S2.

The counter 604 counts the clock signals outputted from the count clock S4 and outputs the counter value. The comparator 605 compares the value of the ΔT information S2 held in the preset register 603 with the value of the counter value outputted from the counter 604, and outputs a trigger signal when the values are equal to each other, and clears the counter 604 using this trigger signal. The pulse generator 606 outputs the prediction window signal S3 using the trigger signal outputted from the comparator 605 as a trigger.

The above-mentioned structure allows obtainment of the counter value corresponding to the time indicated by the ΔT information S2, and thus allows determination of the burst prediction time. In the case where the burst synchronization signal S1 is lost in the low C/N, the pulse generator 606 outputs the prediction window signal S3 while holding the latest ΔT information, which allows a flywheel process which is immune to interference.

Figure 9:
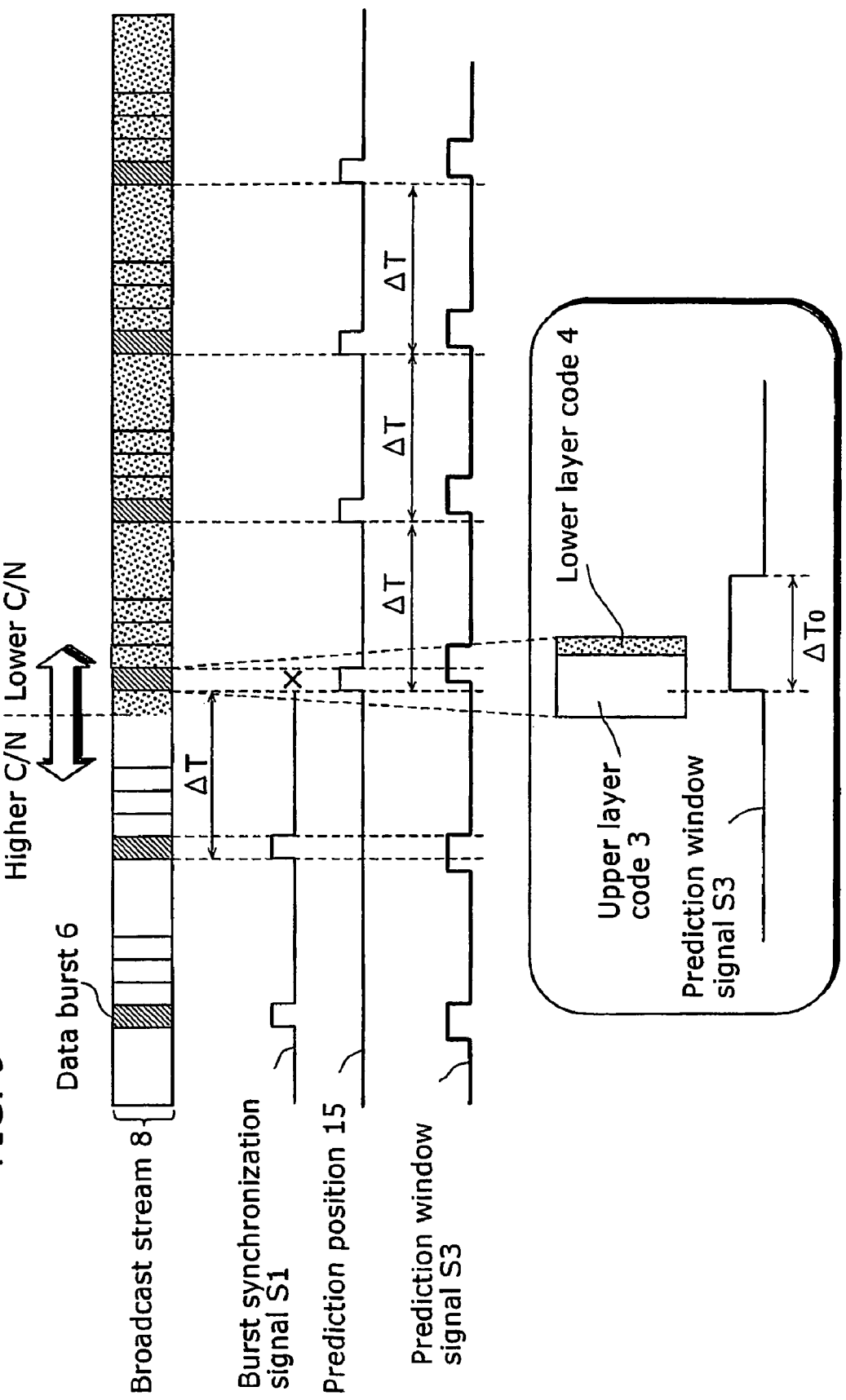
FIG. 9 is a diagram showing timing for capturing a data burst using a prediction window signal in the first embodiment of the present invention.

FIG. 9 is a diagram showing the timing between respective signals for capturing the data burst 6 using a prediction window signal.

Figure 10:
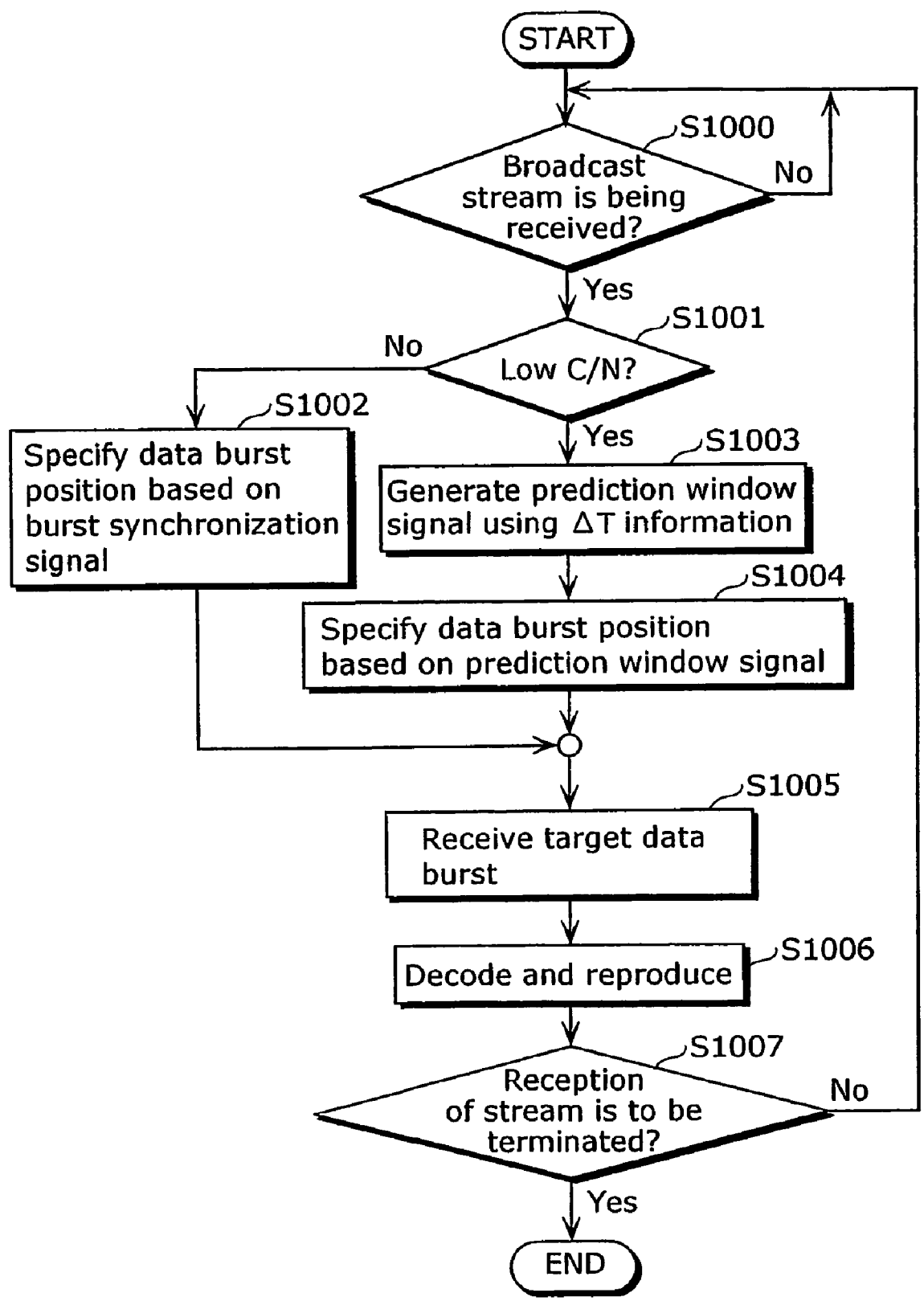
FIG. 10 is a flowchart showing a flow of processing performed in the mobile reception apparatus according to the first embodiment of the present invention.

The specific operations in FIG. 9 are described below using the flowchart in FIG. 10 showing the flow of processing performed in the mobile reception apparatus 200 according to the present embodiment.

In the case where the mobile reception apparatus 200 is receiving a broadcast stream 8 (Yes in S1000) and C/N is low (Yes in S1001), it generates the prediction window signal S3 using the ΔT information (S1003), specifies the position of the data burst 6 or the like based on this prediction window signal S3 (S1004), and receives the target data burst 6 (S1005). On the other hand, when C/N is high (No in S1001), the mobile reception apparatus 200 specifies the position of the data burst 6 or the like based on the burst synchronization signal S1 (S1002) as it has done conventionally, and receives the target data burst (S1005).

Note that in the present embodiment, a description is given, as an example, of a data burst 6 of TS format defined by MPEG-2, but it may be a data burst of another format. As for hierarchical coding, coded data is separated into two codes, an upper layer code and a lower layer code in the present embodiment, but the present invention is not limited to separation into two codes if only n-part separated hierarchical codes can be represented as a set of two layers, namely, a relatively upper layer and a relatively lower layer.

PSI in which control data is multiplexed in TS packet format is used in order to transmit program information, but it may be transmitted via a data channel of an independent system without using PSI, or a program predetermined at the receiving side may be selected without transmitting the program information.

In addition, in the present embodiment, an example is shown that coded audio and video data of a service program is transmitted using a payload of IP packet data which is encapsulated into a TS packet, but the present invention is not limited to such an IP packet format.

In the present embodiment, the ΔT information is the relative time period from the time at which the ΔT(1) or the like appears up to the time at which the next data burst appears, but it is also possible to use, as the ΔT information, the absolute time at which the next data burst appears, and then calculate the relative time.

In the present embodiment, the rate conversion is performed by storing the coded audio and video data into the buffer memory once and reading out it at a fixed rate. However, if the MPEG-4 decoder can accept such audio and video codes in bust form, the data does not always need to be stored into the buffer memory.

In the present embodiment, the ΔT information is embedded into the MAC address field of the IP packet, but it may be embedded into another field.

Furthermore, in the present embodiment, a description is given of the data burst in which the lower layer code follows the upper layer code. But as a matter of course, the upper layer code may follow the lower layer code because the service can be reproduced using only the upper layer code.

Figure 11:
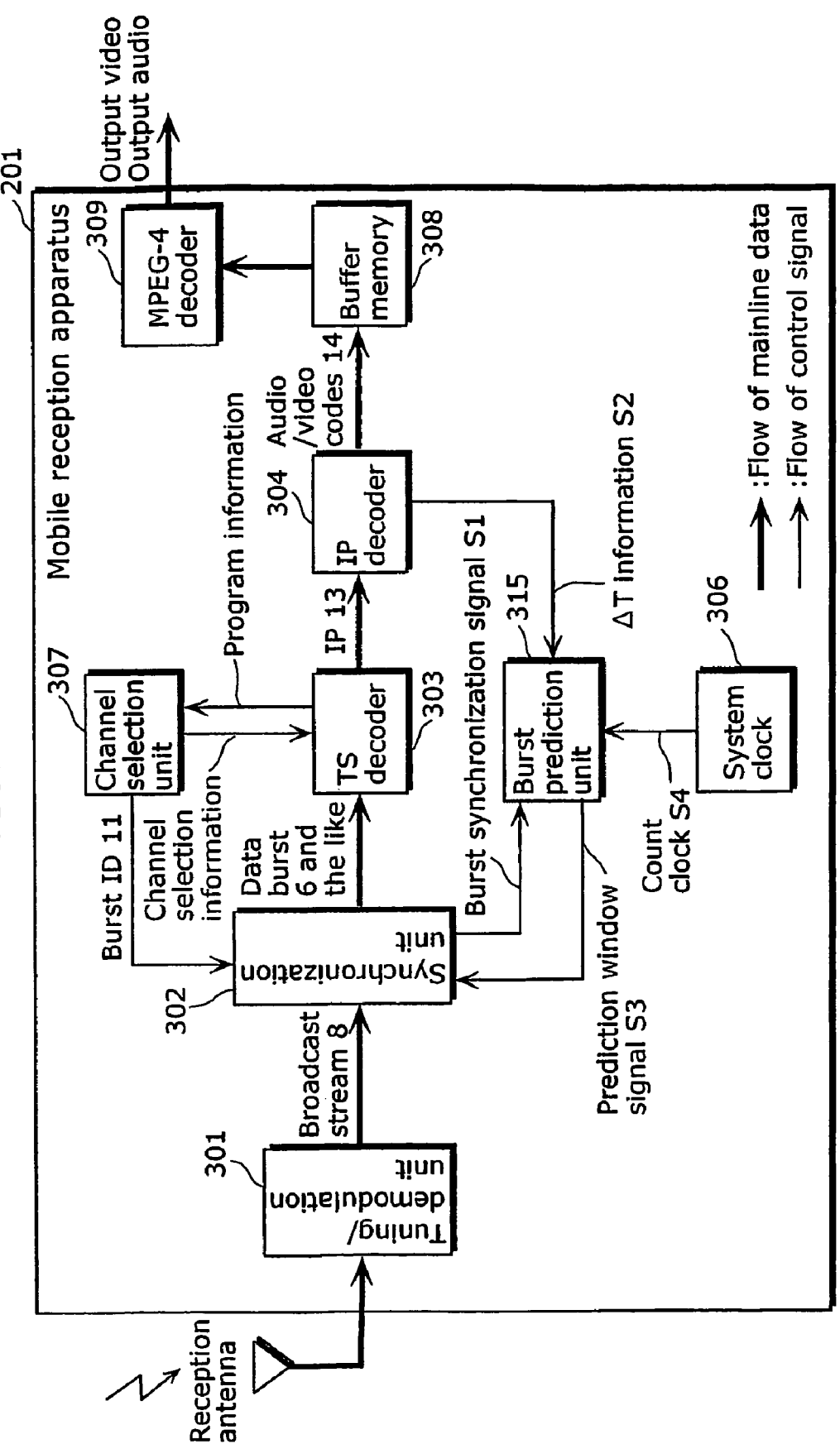
FIG. 11 is a block diagram showing a functional structure of the mobile reception apparatus without a power control unit according to the first embodiment of the present invention.

Note that although the mobile reception apparatus 200 including the power control unit 801 is described in the present embodiment, it does not always need to include the power control unit 801 (See FIG. 11).

Second Embodiment

The above description is given of the first embodiment in which the window width of the prediction window signal S3 is fixed. A description is given below of the second embodiment in which the window width of the prediction window signal S3 is gradually expanded if the reception condition is not improved.

Figure 12:
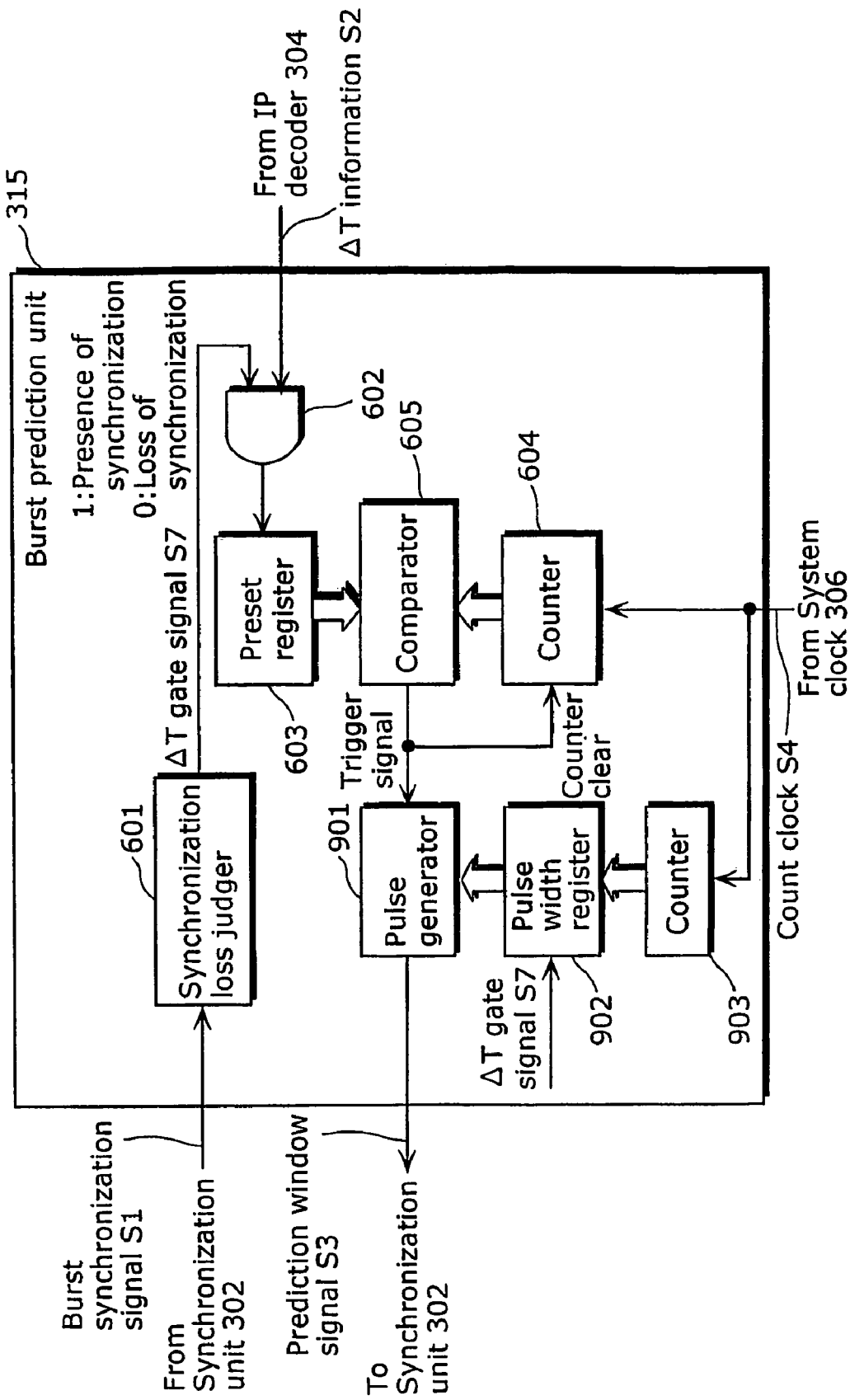
FIG. 12 is a block diagram showing a functional structure of a burst prediction unit according to a second embodiment of the present invention.

FIG. 12 is a block diagram showing the functional structure of the burst prediction unit 315 in the present embodiment.

Note that in FIG. 12, the same reference numbers are assigned to the same components shown in FIG. 8 of the first embodiment, and the description thereof. Is not repeated here.

As shown in FIG. 12, the pulse generator 901 can set from outside the prediction window width of the prediction window signal S3, namely, the value of the pulse width. The counter 903 counts the number of pulses of the count clock S4, and outputs the count value into the pulse width register 902. The pulse width register 902 calculates the pulse width value based on the count value outputted from the counter 903, and outputs it to the pulse generator 901, under the control of the ΔT gate signal S7. Therefore, in the case where the ΔT gate signal S7 is 1, namely, the burst synchronization signal S1 is detected, the pulse width register 902 outputs a predetermined pulse width value to the pulse generator 901.

On the other hand, in the case where the ΔT gate signal S7 is 0, namely, the burst synchronization signal S1 is not detected, the pulse width register 902 outputs the pulse width value, which is calculated based on the count value as mentioned above, to the pulse generator 901.

Figure 13:
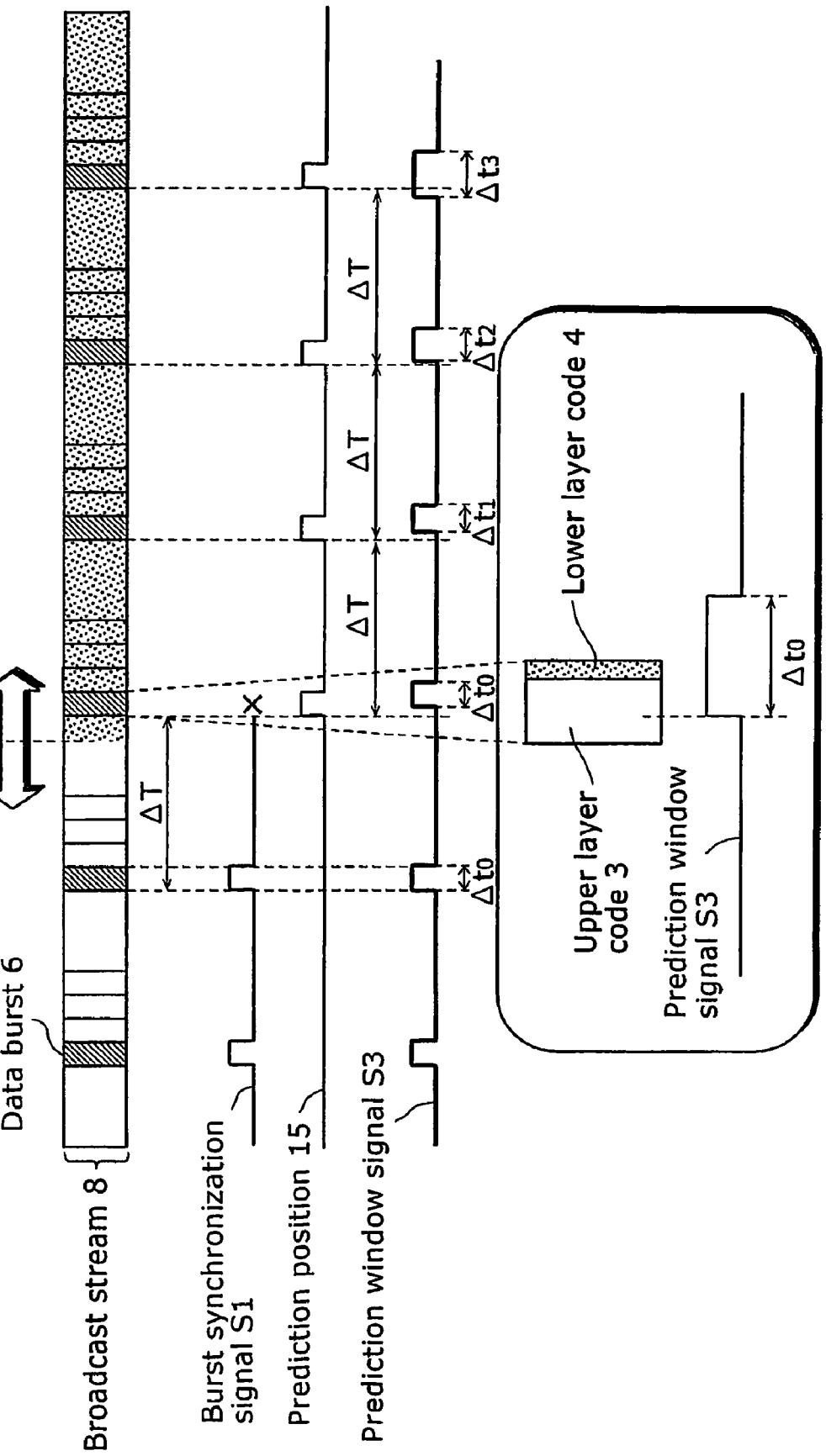
FIG. 13 is a diagram showing timing for capturing a data burst using a prediction window signal in the second embodiment of the present invention.

According to the above structure, as shown in the timing diagram in FIG. 13, during normal reception of the broadcast stream 8 in the high C/N, the pulse generator 901 generates the prediction window signal S3 with a predetermined window width. However, in order to capture the bursts in synchronization using the prediction window signal S3 after the burst synchronization is lost in the lower C/N, the pulse generator generates the prediction window signal of which window width is gradually expanded until the burst synchronization is established. Therefore, it becomes possible to absorb the added-up errors of window positions which are created by the generation of prediction window signal according to the ΔT information S2, so the probability of capturing the burst synchronization increases.

Figure 14:
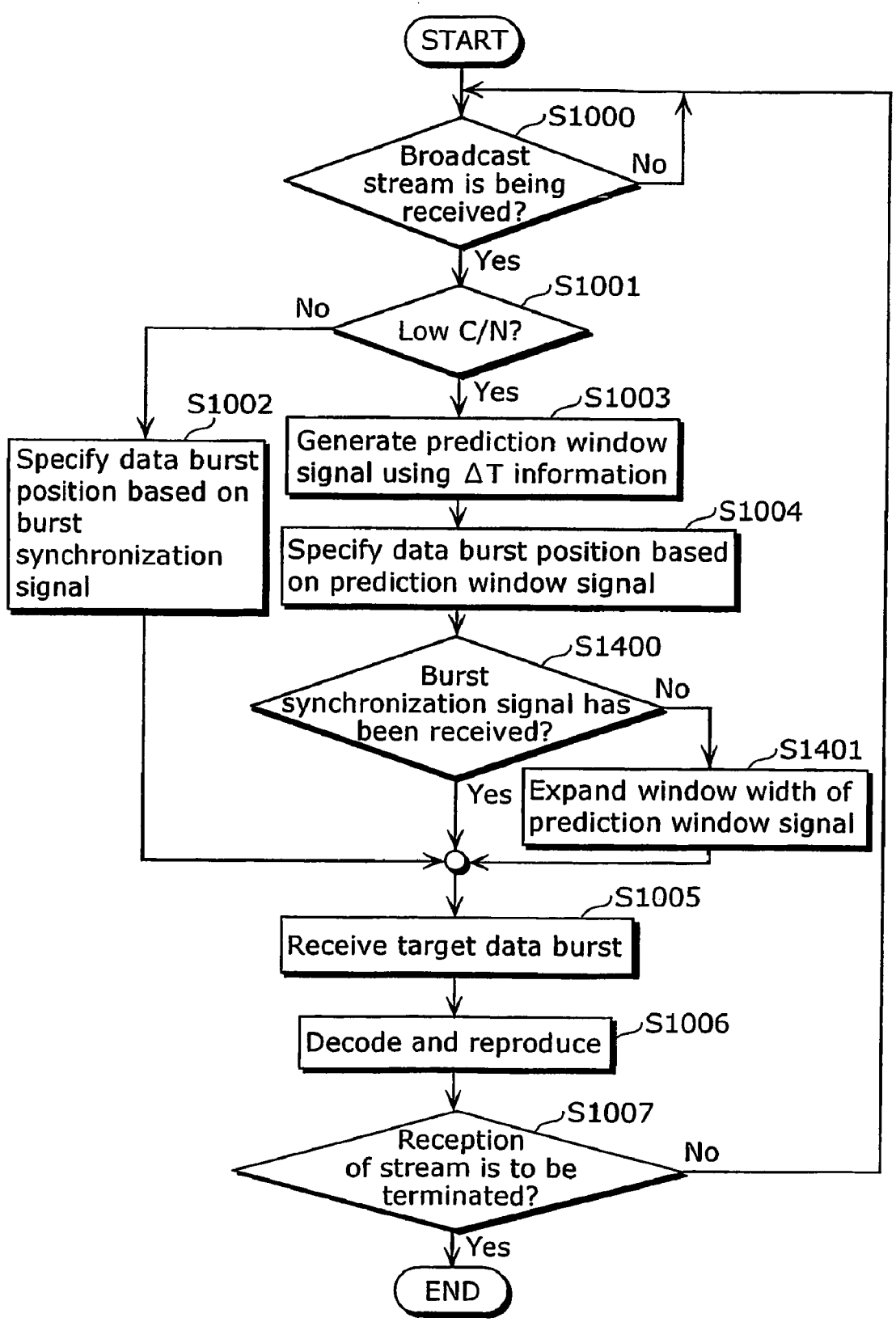
FIG. 14 is a flowchart showing a flow of processing in a mobile reception apparatus according to the second embodiment of the present invention.

FIG. 14 is a flowchart showing the flow of processing in the mobile reception apparatus according to the present embodiment. Note that the same reference numbers are assigned to the same processes shown in the flowchart in FIG. 10 of the first embodiment, and the description thereof is not repeated here.

The mobile reception apparatus according to the present embodiment judges whether or not it has received the burst synchronization signal S1 (S1400), and when it has not received the signal S1, it expands the window width of the prediction window signal S3 by a predetermined time width for receiving the next data burst 6 (S1401).

Note that in the present embodiment, the window width is expanded uniquely and monotonously according to the structures of the counter and register, but it may be expanded arbitrarily using a microcomputer or the like for this purpose.

In addition, in the normal operation of audio and video programs, the bursts of the same channel are transmitted at regular intervals, but there is a possibility that the width of ΔT cannot be kept constant in a transient state such as the case where the service of another channel starts or ends, or the case where irregular data is inserted into the same broadcast stream. Even if such a case occurs at the same time with the low C/N, the probability of capturing bursts increases by gradually expanding the width of the prediction window.

Third Embodiment

Figure 15:
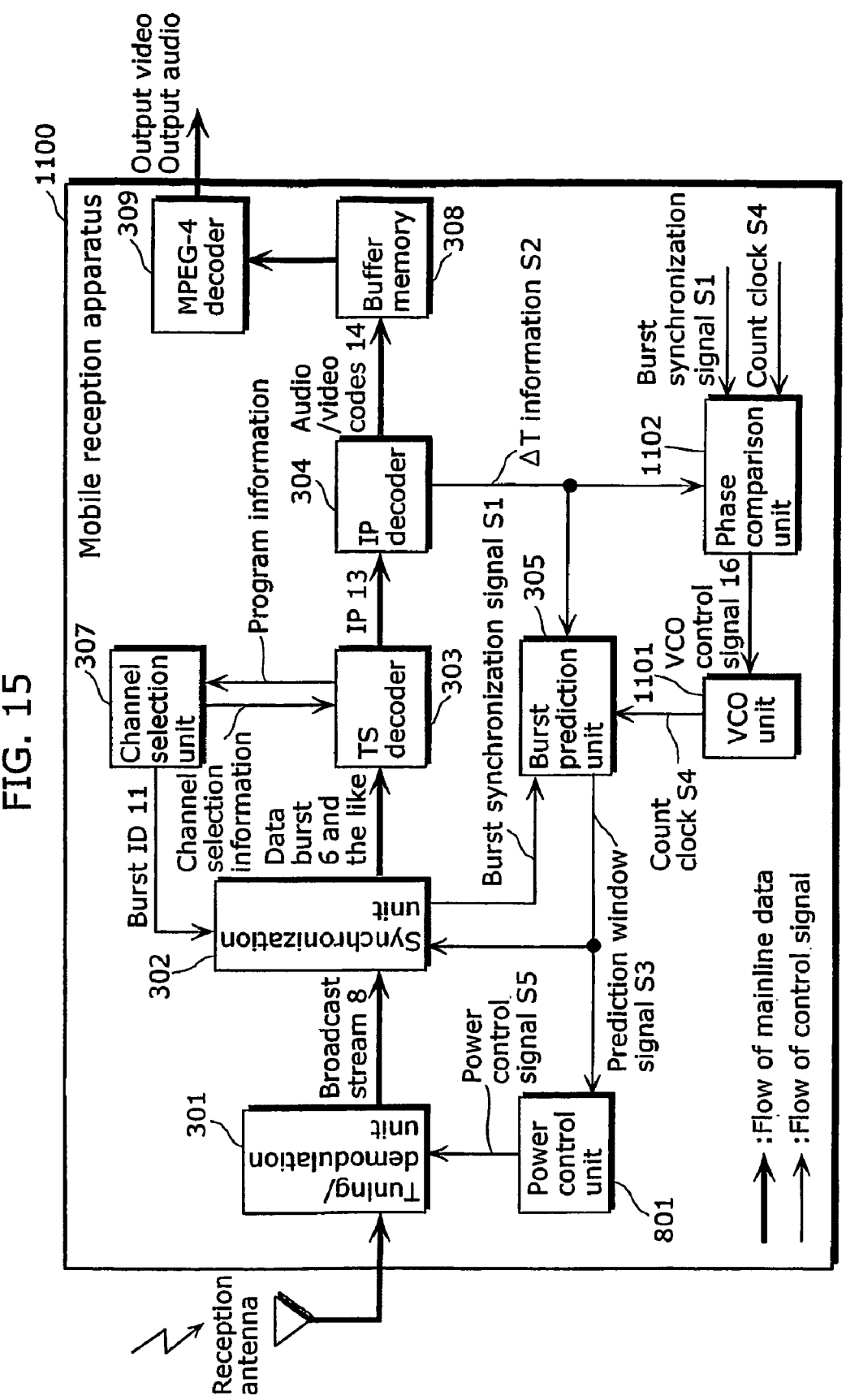
FIG. 15 is a block diagram showing a functional structure of a mobile reception apparatus according to a third embodiment of the present invention.

FIG. 15 is a block diagram showing the functional structure of a mobile reception apparatus 1100 according to the present embodiment of the present invention. In FIG. 15, the same reference numbers are assigned to the same components shown in FIG. 4 of the first embodiment, and the description thereof is not repeated here.

In FIG. 15, the mobile reception apparatus 1100 includes a VCO unit 1101 and a phase comparison unit 1102.

The VCO unit 1101 is a voltage control oscillator which changes the oscillatory frequency by controlling the voltage according to an inputted VCO control signal, and generates a count clock S4.

The phase comparison unit 1102 compares the phases of the burst synchronization signal S1 and the count clock S4, converts the phase difference into a voltage value, and outputs it as a VCO control signal. When the phases are compared, the loop gain of the count clock S4 is adjusted by the ΔT information S2, and therefore the accuracy of phase comparison is improved.

Figure 16:
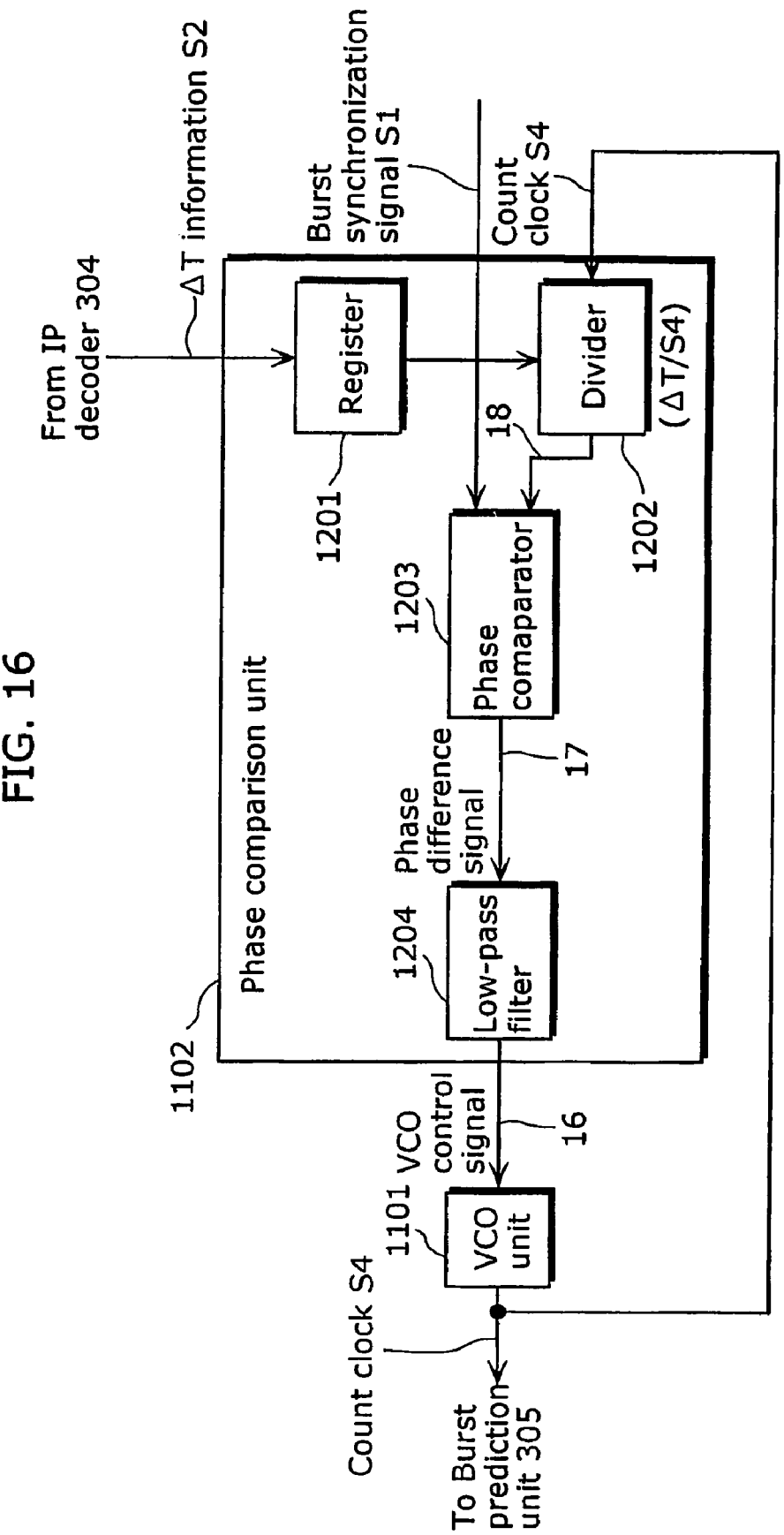
FIG. 16 is a block diagram showing a functional structure of a VCO unit and a phase comparison unit according to the third embodiment of the present invention.

FIG. 16 is a block diagram showing the functional structure of the VCO unit 1101 and the phase comparison unit 1102 in the present embodiment.

As shown in FIG. 16, the phase comparison unit 1102 includes a register 1201, a divider 1202, a phase comparator 1203 and a low-pass filter 1204.

The register 1201 holds the ΔT value of the ΔT information S2, the divider 1202 divides the ΔT value held in the register 1201 by the inputted count clock S4, and outputs the pulse at intervals of the division result, that is, the quotient. The phase comparator 1203 is a unit which compares inputted two pulse signals and outputs the phase difference, and it compares the pulse of the burst synchronization signal S1 and the pulse generated at the quotient intervals, and outputs a phase difference signal. The low-pass filter 1204 performs low-pass filtering on the phase difference signal outputted from the phase comparator 1203 so as to generate a VCO control signal.

According to the above structure, a phase locked loop (PLL) having the burst synchronization signal S1 is established as a reference period, and thus the count clock S4 always has the frequency synchronized with the burst synchronization signal S1. Therefore, the count clock 54 that is a time-keeping unit of the receiver is corrected by the ΔT information S2 that is burst time information, and as a result, it becomes possible to obtain the count clock S4 synchronized with the system clock of the broadcast station and to increase the stability of the reception system.

Note that in the present embodiment, the burst synchronization signal S1 is used as a reference clock for phase comparison, but any data or signal can be used for the same effect if the data or signal synchronizes with the system clock of the broadcast station.

Fourth Embodiment

Figure 17:
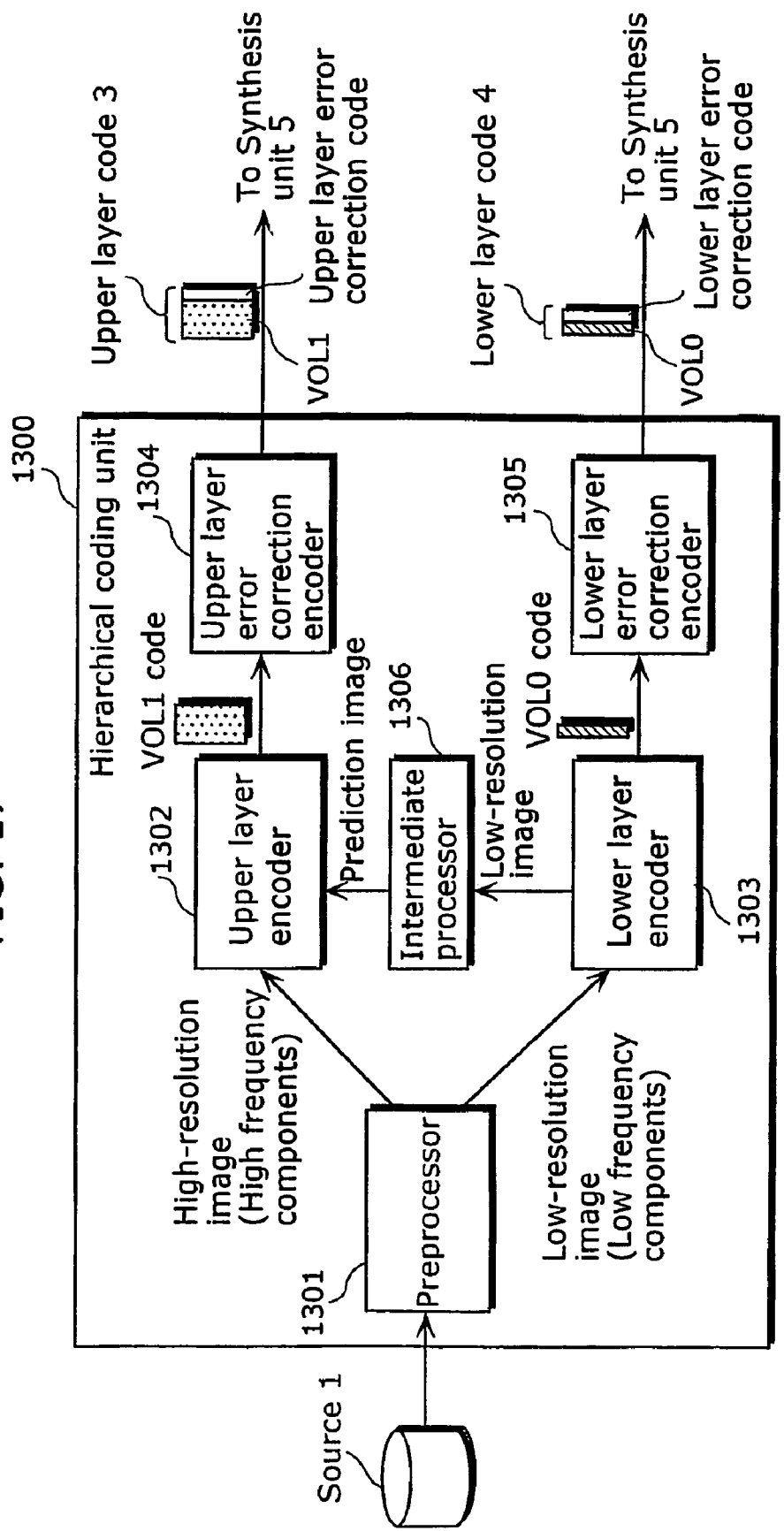
FIG. 17 is a block diagram showing a functional structure of a hierarchical coding unit according to a fourth embodiment of the present invention.

FIG. 17 is a block diagram showing the functional structure of a hierarchical coding unit 1300 in a transmission apparatus according to the present embodiment of the present invention.

As show in FIG. 17, the hierarchical coding unit 1300 includes a preprocessor 1301, an upper layer encoder 1302, a lower layer encoder 1303, an intermediate processor 1306, an upper layer error correction encoder 1304 that is an error correction means, and a lower layer error correction encoder 1305 that is an error correction means.

The preprocessor 1301 performs frequency analysis on an inputted video source, for example, separates it into two types of images, namely, a high-resolution image which is made up of high frequency components and a low-resolution image which is made up of low frequency components, and outputs them.

The upper layer encoder 1302 codes the high-resolution image and generates an MPEG-4 VOL1 code, for example, in TS packet format. The lower layer encoder 1303 codes the low-resolution image and generates an MPEG-4 VOL0 code, for example, in TS packet format. For this purpose, the upper layer encoder 1302 converts the low-resolution image re-generated by the lower layer encoder 1303 in the coding process into a prediction image through the intermediate processor, and uses the prediction image for coding processing.

The upper layer error correction encoder 1304 calculates the upper layer error correction code for the VOL1 code generated by the upper layer encoder 1302, concatenates it with VOL1 to generate the upper layer code 3, and outputs it. The lower layer error correction encoder 1305 calculates a lower layer error correction code for the VOL0 code generated by the lower layer encoder 1303, concatenates it with VOL0 to generate the lower layer code 4, and outputs it. For that purpose, the error correcting capability of the lower layer error correction code is relatively higher than that of the upper layer error correction code. For example, in the case where the hamming distance is 8 when a Reed-Solomon RS (255, 239) code is used as an upper layer error correction code, the error correcting capability of the lower layer error correction code is made higher than that of the upper layer error correction code by setting the hamming distance to be 32 using a RS (255, 191) code as a lower layer error correction code.

According to the above structure, it becomes possible to achieve more stable reproduction of a service even in the case where only the lower layer is decoded in the low C/N state or the like so as to continue the reproduction of the service.

Note that in the present embodiment, a Reed-Solomon code and a particular processing code length are used, but the same effect can be obtained even if another error correction code and another code length are used. The error correction encoders are separately provided for the upper layer and the lower layer, but it is also possible to time-share, for both of these layers, only one error correction encoder in which parameters can be changed. In addition, it is also possible to generate and add an error correction code as software processing in the upper layer encoder and the lower layer encoder, without including the error correction encoder in the hierarchical coding unit. It is also possible to add an error correction code after interleaving each layer code.

Furthermore, in the present embodiment, the preprocessor separates a source signal hierarchically depending on its frequency components, but the source signal may be separated hierarchically depending on other physical parameters. In addition, although the TS data format is used in the present embodiment, another format may be used.

Fifth Embodiment

Figure 18:
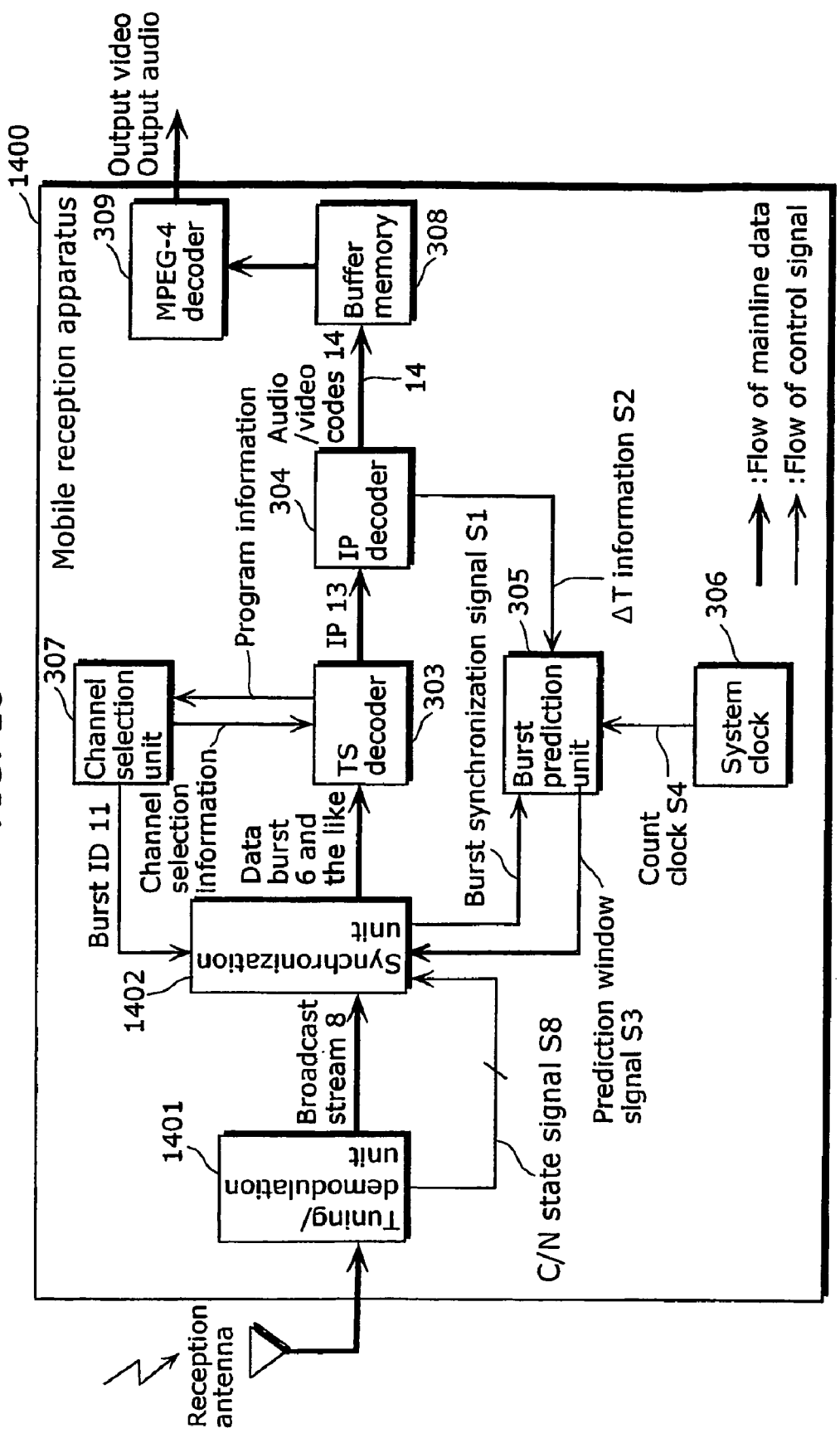
FIG. 18 is a block diagram showing a functional structure of a mobile reception apparatus according to a fifth embodiment of the present invention.

FIG. 18 is a block diagram showing the functional structure of a mobile reception apparatus 1400 according to the present embodiment. Note that in FIG. 18, the same reference numbers are assigned to the same components shown in FIG. 4 of the first embodiment, and the description thereof is not repeated here.

As shown in FIG. 18, the mobile reception apparatus 1400 includes a tuning/demodulation unit 1401 and a synchronization unit 1402.

The tuning/demodulation unit 1401 has a function of measuring the C/N state of the received radio waves in real time, and outputs the data value representing the C/N state as a C/N state signal S8. In the case where the C/N state signal S8 indicates the decrease of the C/N, the synchronization unit 1402 captures the data bursts using the prediction window signal S3, not using the synchronization code in the TS.

Figure 19:
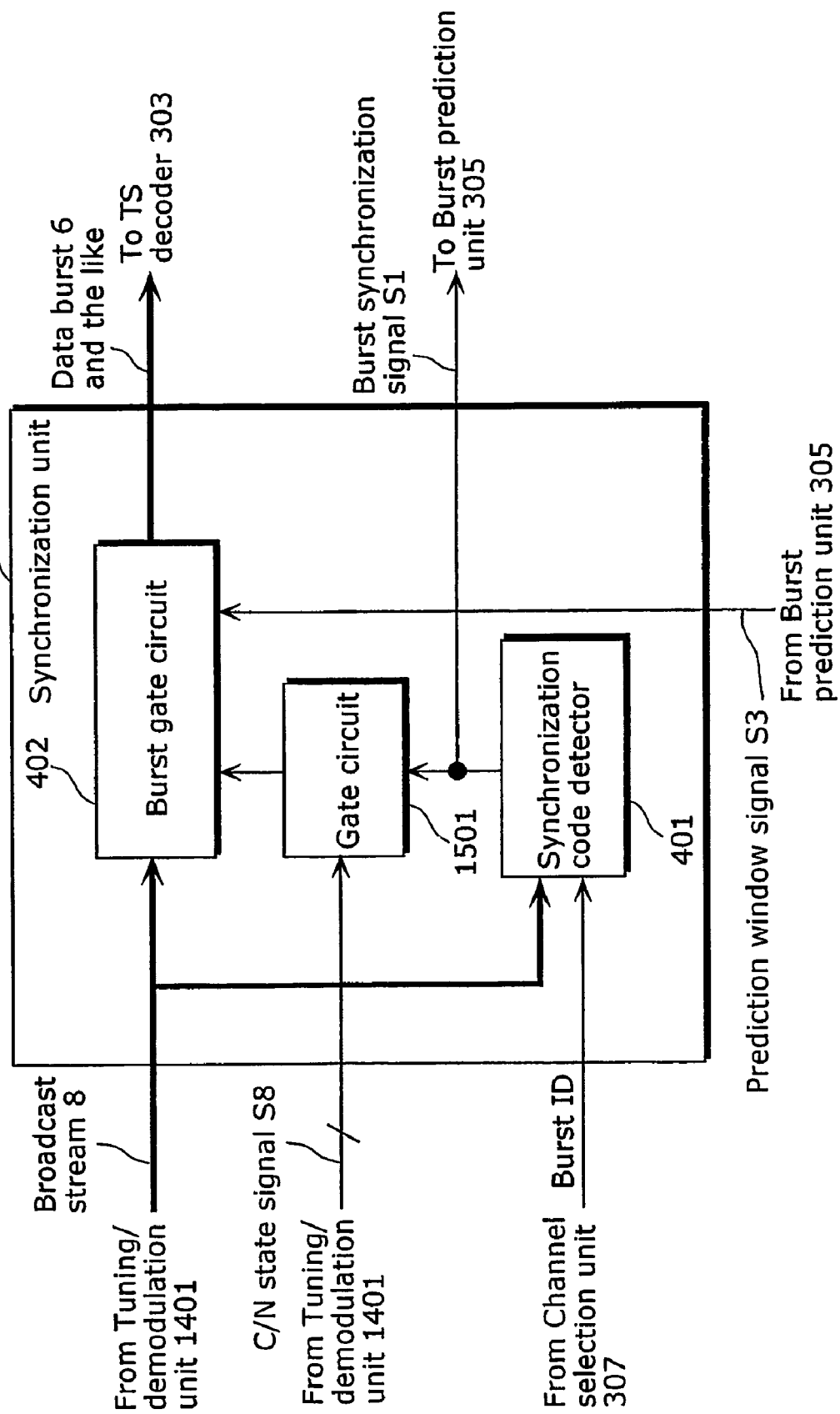
FIG. 19 is a block diagram showing a functional structure of a synchronization unit according to the fifth embodiment of the present invention.

FIG. 19 is a block diagram showing the functional structure of a synchronization unit 1402 in the present embodiment. Note that in FIG. 19, the same reference numbers are assigned to the same components shown in FIG. 6 of the first embodiment, and the description thereof is not repeated here.

As shown in FIG. 19, a gate circuit 1501 has a function of closing the gate circuit when the C/N data value of the C/N state signal S8 indicates a C/N value lower than a predetermined value. Therefore, when the C/N decreases, the gate circuit 1501 interrupts the burst synchronization signal S1 detected by the synchronization code detector 401, so the burst gate circuit 402 performs the operation of capturing data bursts using the prediction window signal S3. According to this structure, it is possible to detect the decrease of the C/N state before it becomes worse to a degree that the synchronization code cannot be detected, and then to switch the extraction of the data bursts into the extraction using the prediction window signal. Therefore, it becomes possible to achieve stable reception and reproduction of services even in the case where the C/N state changes dynamically depending on the high-speed movement of the mobile reception apparatus.

Note that in the present embodiment, the C/N state signal S8 is directly inputted into the gate circuit 1501 in the synchronization unit 1402 from the tuning/demodulation unit 1401, but it is also possible to control the gate circuit 1501 by software through a microcomputer provided between the tuning/demodulation unit 1401 and the gate circuit 1501.

Furthermore, in the first to fifth embodiments, it is possible to further improve the stability of reproduction of services by using, for a high frequency transmission layer, an error correction code such as a convolutional code and a turbo code, as an outer code, that delivers high performance for correction of continuous code errors.

The broadcast transmission and reception method for mobile terminals according to the present invention can be applied to methods and apparatuses for transmitting and receiving digital broadcasts and digital data broadcasts in mobile environments.

The invention claimed is:

1. A digital broadcasting system for transmitting and receiving, via a network, a broadcast stream created from a broadcast source, the broadcast source including image and audio data and being used for broadcasting, said digital broadcasting system comprising:
   a coding unit operable to code the broadcast source based on a characteristic of the broadcast source and operable to generate a first layer code and a second layer code from the coded broadcast source, the first layer code and the second layer code, respectively, being for reproduction of the broadcast source;
   a synthesizing unit operable to generate data bursts, each of the generated data bursts including the generated first layer code and second layer code;
   a multiplexing unit operable to create the broadcast stream by multiplexing the generated data bursts;
   a transmitting unit operable to transmit the created broadcast stream to the network;

a receiving unit operable to receive the transmitted broadcast stream;
a decoding unit operable to extract, from the received broadcast stream, at least one of the first layer code and the second layer code; and
a reproducing unit operable to reproduce the broadcast source using the at least one of the first layer code and the second layer code extracted by said decoding unit.

2. The digital broadcasting system according to claim 1, wherein the broadcast source includes content data for each service of a plurality of services,
wherein said digital broadcasting system further comprises:
 a clocking unit operable to keep time; and
 a prediction window generating unit operable to generate a prediction window signal that indicates a time at which a target data burst to be received appears in the broadcast stream, the time indicated by the prediction window signal being specified by said clocking unit, and
wherein said receiving unit is operable to receive, from the received broadcast stream, only a data burst that corresponds to content data of one service of the plurality of services and only while the prediction window signal is in an active state.

3. The digital broadcasting system according to claim 2, wherein said receiving unit is operable to control a power supply for the reception of the data burst that corresponds to the content data of the one service, such that the power supply increases only while the prediction window signal is in the active state.

4. The digital broadcasting system according to claim 2, wherein said synthesizing unit is operable to add burst time information into each of the generated data bursts, the burst time information added into one generated data burst of the generated data bursts indicating a time at which a next data burst, of the generated data bursts to be received appears in the broadcast stream, and
wherein said prediction window generating unit is operable to determine a timing at which the prediction window signal turns into the active state and a window width of the prediction window signal, according to the burst time information.

5. The digital broadcasting system according to claim 4, wherein said receiving unit includes a time-keeping unit operable to keep a reference time of said digital broadcast system, and
wherein said time-keeping unit is operable to correct the reference time according to the burst time information.

6. The digital broadcast system according to claim 2, wherein said prediction window generating unit is operable to expand a window width of the prediction window signal by a predetermined length of time when said receiving unit cannot receive a whole signal of the target data burst.

7. The digital broadcast system according to claim 2, wherein said synthesizing unit is operable to add, to each data burst of the generated data bursts, at least one error correction code for correcting a code error that occurs when the broadcast stream is transmitted.

8. The digital broadcast system according to claim 7, wherein the at least one error correction code is added to the first layer code and the second layer code individually, and
wherein a correction capability of the error correction code added to the second layer code is higher than a correction capability of the error correction code added to the first layer code.

9. A transmission apparatus for use in a digital broadcasting system for transmitting and receiving, via a network, a broadcast stream created from a broadcast source, the broadcast source including image and audio data and being used for broadcasting, said transmission apparatus comprising:
 a coding unit operable to code the broadcast source based on a characteristic of the broadcast source and operable to generate a first layer code and a second layer code from the coded broadcast source, the first layer code and the second layer code, respectively, being for reproduction of the broadcast source;
 a synthesizing unit operable to generate data bursts, each of the generated data bursts including the generated first layer code and second layer code;
 a multiplexing unit operable to create the broadcast stream by multiplexing the generated data bursts; and
 a transmitting unit operable to transmit the created broadcast stream to the network.

10. A reception apparatus for use in a digital broadcasting system for transmitting and receiving, via a network, a broadcast stream created from a broadcast source, the broadcast source including image and audio data and being used for broadcasting, said reception apparatus comprising:
 a receiving unit operable to receive the broadcast stream via the network;
 a decoding unit operable to extract, from the received broadcast stream, at least one of a first layer code and a second layer code, the first layer code and the second layer code (i) being generated from the broadcast source coded based on a characteristic of the broadcast source, and (ii) respectively being for reproduction of the broadcast source; and
 a reproducing unit operable to reproduce the broadcast source using the at least one of the first layer code and the second layer code extracted by said decoding unit.

11. A transmission and reception method for use in a digital broadcasting system for transmitting and receiving, via a network, a broadcast stream created from a broadcast source, the broadcast source including image and audio data and being used for broadcasting, said transmission and reception method comprising:
 coding the broadcast source based on a characteristic of the broadcast source and generating a first layer code and a second layer code from the coded broadcast source, the first layer code and the second layer code, respectively, being for reproduction of the broadcast source;
 generating data bursts, each of the generated data bursts including the generated first layer code and second layer code;
 creating the broadcast stream by multiplexing the generated data bursts;
 transmitting the created broadcast stream to the network;
 receiving the transmitted broadcast stream;
 extracting, from the received broadcast stream, at least one of the first layer code and the second layer code; and
 reproducing the broadcast source using the at least one of the first layer code and the second layer code extracted by said extracting.

* * * * *

UNITED STATES PATENT AND TRADEMARK OFFICE
CERTIFICATE OF CORRECTION

| | | |
|---|---|---|
| PATENT NO. | : 7,685,498 B2 | Page 1 of 1 |
| APPLICATION NO. | : 10/586438 | |
| DATED | : March 23, 2010 | |
| INVENTOR(S) | : Takashi Mizuta | |

It is certified that error appears in the above-identified patent and that said Letters Patent is hereby corrected as shown below:

Title page Item [57] in the Abstract, the second line from the bottom "the second layer codes and a TS decoder" should read -- the second layer code and a TS decoder --

Signed and Sealed this

Seventeenth Day of August, 2010

David J. Kappos
*Director of the United States Patent and Trademark Office*